(12) United States Patent
Lee et al.

(10) Patent No.: US 11,150,870 B2
(45) Date of Patent: Oct. 19, 2021

(54) METHOD FOR PROVIDING NATURAL LANGUAGE EXPRESSION AND ELECTRONIC DEVICE SUPPORTING SAME

(71) Applicant: Samsung Electronics Co., Ltd., Suwon-si (KR)

(72) Inventors: Yun Hee Lee, Suwon-si (KR); Eun A Jung, Osan-si (KR); Sang Ho Chae, Anyang-si (KR); Ji Hyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/648,889

(22) PCT Filed: Sep. 19, 2018

(86) PCT No.: PCT/KR2018/011063
§ 371 (c)(1),
(2) Date: Mar. 19, 2020

(87) PCT Pub. No.: WO2019/059642
PCT Pub. Date: Mar. 28, 2019

(65) Prior Publication Data
US 2020/0225908 A1 Jul. 16, 2020

(30) Foreign Application Priority Data
Sep. 19, 2017 (KR) .................... 10-2017-0120445

(51) Int. Cl.
*G06F 3/048* (2013.01)
*G06F 3/16* (2006.01)
(Continued)

(52) U.S. Cl.
CPC ............ *G06F 3/167* (2013.01); *G06F 3/0488* (2013.01); *G10L 15/26* (2013.01)

(58) Field of Classification Search
CPC ............... G06F 3/04817; G06F 3/0482; G06F 3/04842; G06F 3/0488; G06F 3/167
See application file for complete search history.

(56) References Cited

U.S. PATENT DOCUMENTS 7,895,595 B2 2/2011 Hammond et al.
8,978,033 B2 3/2015 Hammond et al.
(Continued)

FOREIGN PATENT DOCUMENTS

KR 10-2016-0016530 A 2/2016
KR 10-2016-0059026 A 5/2016
KR 10-2016-0061733 A 6/2016

OTHER PUBLICATIONS

ISA/KR, International Search Report and Written Opinion of the International Searching Authority, International Application No. PCT/KR2018/011063, dated Dec. 17, 2018, 13 pages.

*Primary Examiner* — Claudia Dragoescu

(57) ABSTRACT

An embodiment of the present invention comprises a touch screen display, a communication circuit, a microphone, a speaker, a processor, and a memory. Wherein: the memory stores a first application program that includes a first user interface, and an intelligent application program that includes a second user interface; and the memory can cause the processor to display the first user interface at the time of execution and to receive a first user input for displaying the second user interface while displaying the first user interface.

15 Claims, 15 Drawing Sheets

(51) Int. Cl.
    *G06F 3/0488*    (2013.01)
    *G10L 15/26*     (2006.01)

(56) References Cited

U.S. PATENT DOCUMENTS

| | | |
|---|---|---|
| 9,305,374 B2 | 4/2016 | Kocienda et al. |
| 9,338,493 B2 | 5/2016 | Van Os et al. |
| 9,355,472 B2 | 5/2016 | Kocienda et al. |
| 9,582,246 B2 | 2/2017 | Klein et al. |
| 9,668,024 B2 | 5/2017 | Os et al. |
| 9,966,068 B2 | 5/2018 | Cash et al. |
| 10,127,011 B2 | 11/2018 | Bang et al. |
| 10,175,871 B2 | 1/2019 | Kocienda et al. |
| 2005/0028156 A1 | 2/2005 | Hammond et al. |
| 2011/0209150 A1 | 8/2011 | Hammond et al. |
| 2014/0040748 A1* | 2/2014 | Lemay ................ G10L 15/1822 715/728 |
| 2014/0267363 A1 | 9/2014 | Kocienda et al. |
| 2014/0365227 A1 | 12/2014 | Cash et al. |
| 2015/0178350 A1 | 6/2015 | Hammond et al. |
| 2015/0254058 A1 | 9/2015 | Klein et al. |
| 2016/0034253 A1* | 2/2016 | Bang .................... G06F 9/5055 715/728 |
| 2016/0147388 A1 | 5/2016 | Shin et al. |
| 2016/0212488 A1 | 7/2016 | Os et al. |
| 2017/0329466 A1* | 11/2017 | Krenkler ................ G06F 40/30 |
| 2017/0357387 A1* | 12/2017 | Clarke ................... G06F 3/016 |
| 2018/0358015 A1 | 12/2018 | Cash et al. |

\* cited by examiner

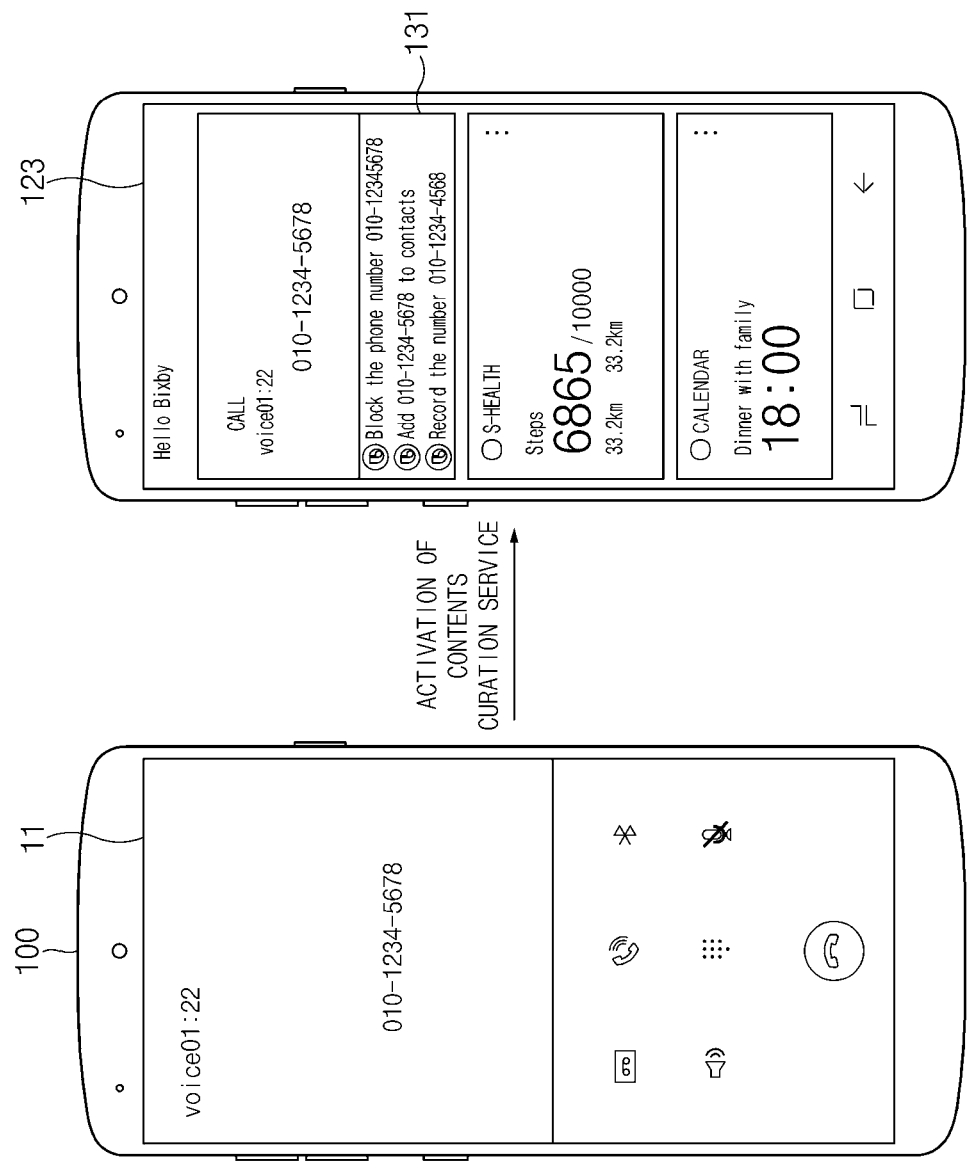

METHOD FOR PROVIDING NATURAL LANGUAGE EXPRESSION AND ELECTRONIC DEVICE SUPPORTING SAME

CROSS-REFERENCE TO RELATED APPLICATIONS

This application is a 371 National Stage of International Application No. PCT/KR2018/011063, filed Sep. 19, 2018, which claims priority to Korean Patent Application No. 10-2017-0120445, filed Sep. 19, 2017, the disclosures of which are herein incorporated by reference in their entirety.

BACKGROUND

1. Field

Embodiments disclosed in this specification relate to a technology for providing a natural language expression in association with the operation of a speech recognition service.

2. Description of Related Art

For the purpose of aiming interaction with a user, recent electronic devices have suggested various input methods. For example, an electronic device may operate a voice input scheme for directly receiving and processing information uttered by a user. Furthermore, the electronic device may recognize the received voice data to derive the intent of a user utterance and then may support a speech recognition service such as performing an operation corresponding to the derived intent.

Various operating platforms have been built in response to the commercialization of speech recognition service. For example, when the electronic device processes a user utterance based on the execution of a specific application supporting a speech recognition service, the electronic device may provide a natural language expression (e.g., example utterance, representative utterance, related utterance, or the like) associated with the user utterance or the context of the electronic device.

SUMMARY

The providing of a natural language expression may be premised on (or based on) the execution of the specific application that processes a user utterance. Accordingly, when the user utterance does not occur or when a specific application is not executed, an electronic device may be vulnerable to providing natural language expressions that reflect the context in this environment.

In this specification, disclosed are a natural language expression providing method capable of providing a natural language expression according to current context information of an electronic device based on an easily accessible user interface, and the electronic device supporting the same.

According to an embodiment, an electronic device may include a touch screen display, at least one communication circuit, a microphone, at least one speaker, at least one processor electrically connected to the touch screen display, the communication circuit, the microphone, and the speaker, and at least one memory electrically connected to the processor.

According to an embodiment, the memory may store a first application program including a first user interface and an intelligence application program including a second user interface.

According to an embodiment, the memory may stores instructions that, when executed, cause the processor to display the first user interface on the display, while displaying the first user interface, to receive a first user input for displaying the second user interface on the display, to transmit an identifier associated with the first application program and/or the first user interface to an external server through the communication circuit, to receive information about at least one utterance for making a request for a task performed by the electronic device, from the external server by using the first application program, and to display the second user interface including a text based at least partly on the received information about the utterance, on the display.

According to various embodiments, it is possible to provide a natural language expression organically corresponding to an operating environment of an electronic device through a path relatively easily accessible by a user.

According to various embodiments, the operation of the corresponding electronic device is performed depending on the user's selection of the natural language expression, thereby supporting the operation of a speech recognition service in an environment that is difficult to speak.

Besides, a variety of effects directly or indirectly understood through the disclosure may be provided.

BRIEF DESCRIPTION OF THE DRAWINGS

FIG. 4C is a diagram illustrating a form of a contents curation service activated from a third state of a user terminal, according to an embodiment.

DETAILED DESCRIPTION

Figure 1A:
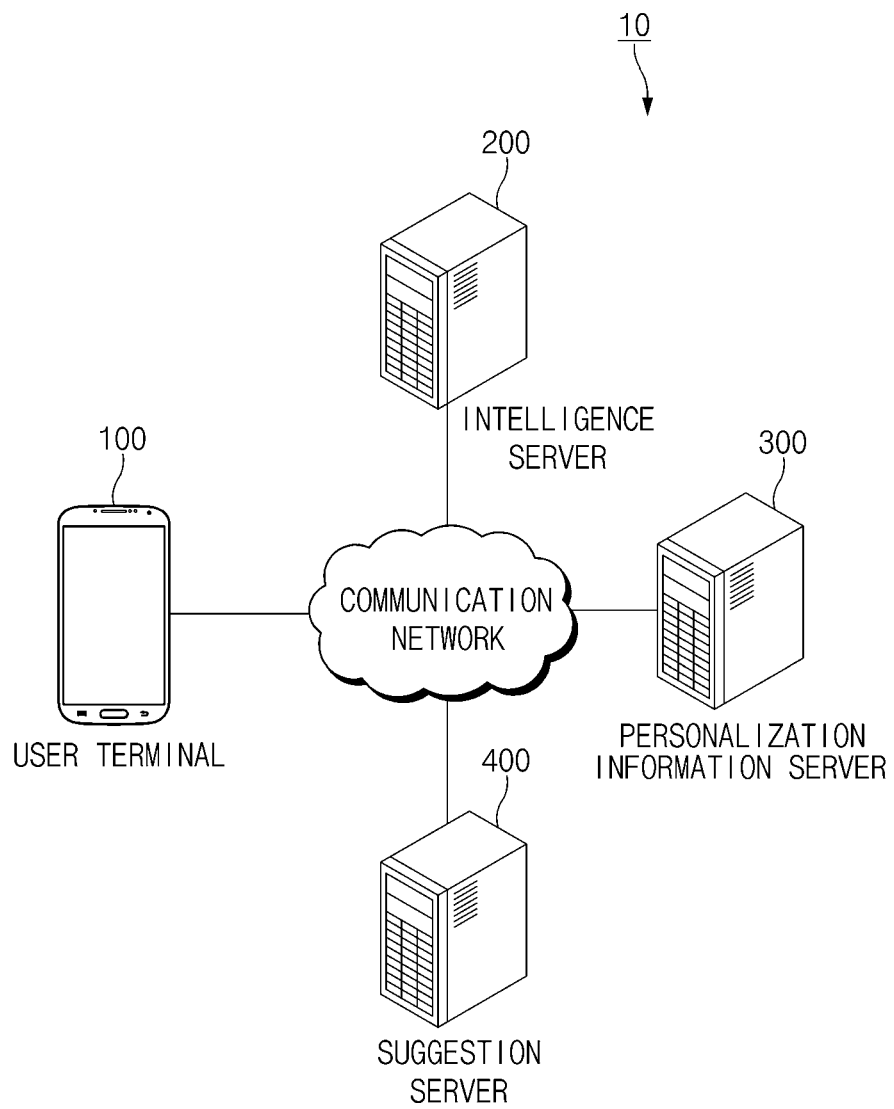
FIG. 1A is a diagram illustrating an integrated intelligence system, according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or Play Station™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

Prior to describing this disclosure, an integrated intelligence system to which various embodiments of the disclosure is capable of being applied will be described with reference to FIGS. 1A to 1F.

FIG. 1A is a diagram illustrating an integrated intelligence system, according to an embodiment.

Referring to FIG. 1A, an integrated intelligence system 10 may include a user terminal 100, an intelligence server 200, a personalization information server 300, or a suggestion server 400.

The user terminal 100 may provide a service necessary for a user through an app (or an application program) (e.g., an alarm app, a message app, a photo (gallery) app, or the like) stored in the user terminal 100. For example, the user terminal 100 may execute and operate other app through an intelligence app (or a speech recognition app) stored in the user terminal 100. The user terminal 100 may receive a user input for executing the other app and executing an action through the intelligence app of the user terminal 100. For example, the user input may be received through a physical button, a touch pad, a voice input, a remote input, or the like. According to an embodiment, various types of terminal devices (or an electronic device), which are connected with Internet, such as a mobile phone, a smartphone, personal digital assistant (PDA), a notebook computer, and the like may correspond to the user terminal 100.

According to an embodiment, the user terminal 100 may receive a user utterance as a user input. The user terminal 100 may receive the user utterance and may generate a command for operating an app based on the user utterance. As such, the user terminal 100 may operate the app, using the command.

The intelligence server 200 may receive a voice input of a user from the user terminal 100 over a communication network and may convert the voice input to text data. In another embodiment, the intelligence server 200 may generate (or select) a path rule based on the text data. The path rule may include information about an action (or an operation) for performing the function of an app or information about a parameter necessary to perform the action. In addition, the path rule may include the order of the action of the app.

The user terminal 100 may receive the path rule, may select an app depending on the path rule, and may execute the action included in the path rule in the selected app. Generally, the term "path rule" of the disclosure may mean, but not limited to, the sequence of states, which allows the electronic device (or a user terminal) to perform the task requested by the user. In other words, the path rule may include information about the sequence of the states. For example, the task may be a certain action that the intelligence app is capable of providing. The task may include the generation of a schedule, the transmission of a photo to a desired counterpart, or the provision of weather information.

The user terminal 100 may perform the task by sequentially having at least one state (e.g., an operating state of the user terminal 100).

According to an embodiment, the path rule may be provided or generated by an artificial intelligent (AI) system. The AI system may be a rule-based system, or may be a neural network-based system (e.g., a feedforward neural network (FNN) or a recurrent neural network (RNN)). Alternatively, the AI system may be a combination of the above-described systems or an AI system different from the above-described system. According to an embodiment, the path rule may be selected from a set of predefined path rules or may be generated in real time in response to a user request. For example, the AI system may select at least a path rule of predefined plurality of path rules, or may generate a path rule dynamically (or in real time). Furthermore, the user terminal 100 may use a hybrid system to provide the path rule.

According to an embodiment, the user terminal 100 may execute the action and may display a screen corresponding to a state of the user terminal 100, which executes the action, in a display. For another example, the user terminal 100 may execute the action and may not display the result obtained by executing the action in the display. For example, the user terminal 100 may execute a plurality of actions and may display only the result of a part of the plurality of actions on the display. For example, the user terminal 100 may display only the result, which is obtained by executing the last action, on the display. For another example, the user terminal 100 may receive a user input to display the result of executing the action at the corresponding to time, on the display.

The personalization information server 300 may include a database in which user information is stored. For example, the personalization information server 300 may receive the user information (e.g., context information, execution of an app, or the like) from the user terminal 100 and may store the user information in the database. The personalization information server 300 may transmit the user information to the intelligence server 200 over a communication network and then may support the execution of the intelligence server 200 (e.g., generating a path rule for a user input). According to an embodiment, the user terminal 100 may receive the user information from the personalization information server 300 over the communication network, and may use the user information as information for managing the database. Alternatively, the user terminal 100 may receive at least one natural language expression (e.g., example utterance, alternative utterance, related utterance, or the like) based on the user information from the personalization information server 300 and then may use the contents curation service operation to be described below.

The suggestion server 400 may include a database storing information about a function in a terminal, introduction of an application, or a function to be provided. For example, the suggestion server 400 may receive the user information of the user terminal 100 from the personalization information server 300 and may include the database of a function that a user is capable of utilizing. The user terminal 100 may receive information about the function to be provided from the suggestion server 400 over the communication network and may provide the information to the user.

Figure 1B:
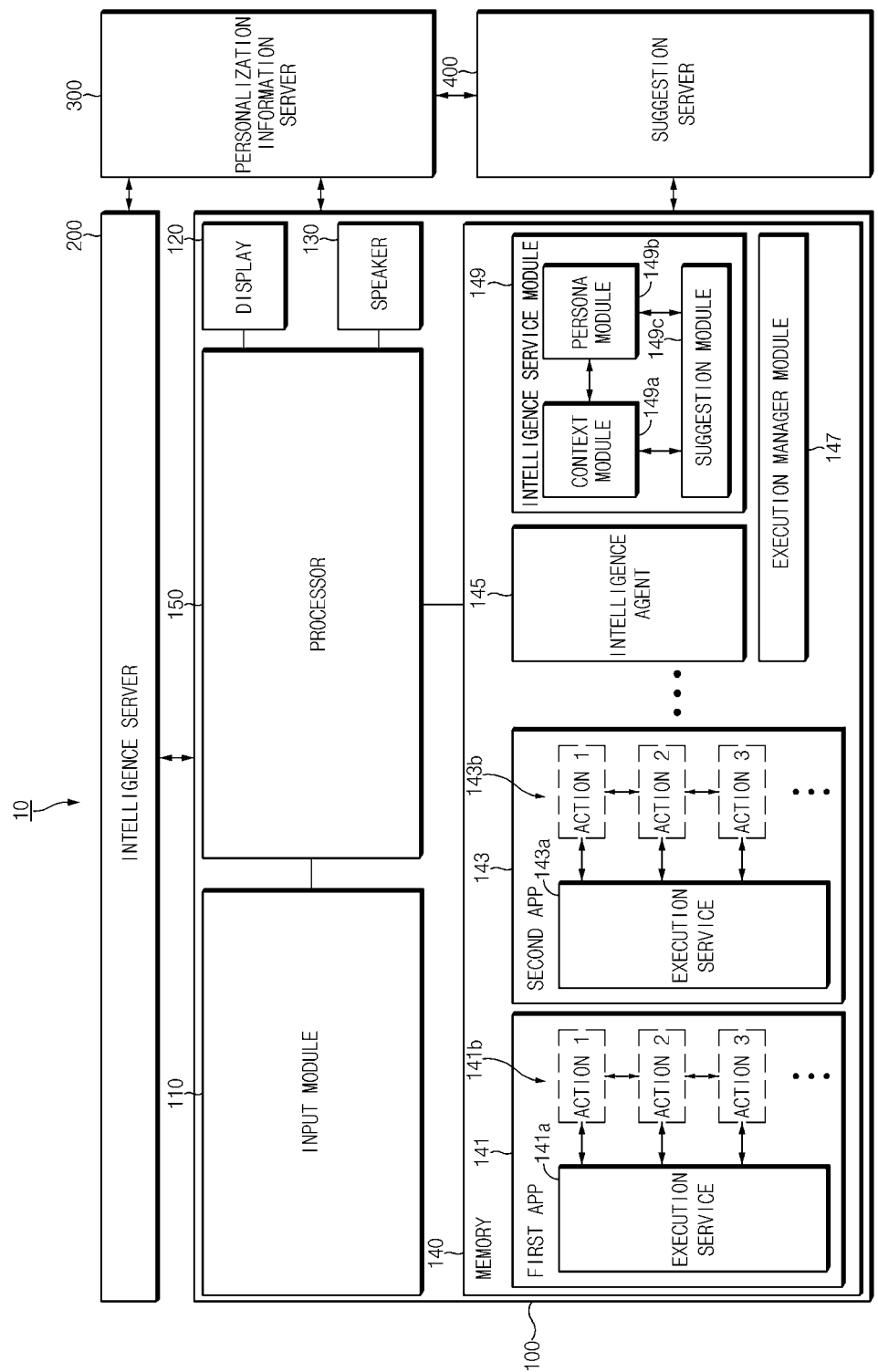
FIG. 1B is a diagram illustrating a user terminal of an integrated intelligence system, according to an embodiment.

FIG. 1B is a diagram illustrating a user terminal of an integrated intelligence system, according to an embodiment.

Referring to FIG. 1B, the user terminal 100 may include an input module 110, a display 120, a speaker 130, a memory 140, or a processor 150. At least part of components of the user terminal 100 (e.g., the input module 110, the display 120, the speaker 130, the memory 140, or the like) may be electrically connected to the processor 150. The user terminal 100 may further include housing, and components of the user terminal 100 may be seated in the housing or may be positioned on the housing. The user terminal 100 may further include a communication circuit positioned in the housing. A communication circuit according to an embodiment may establish wired communication or wireless communication according to the defined protocol with at least one external device (e.g., the intelligence server 200, the personalization information server 300 or the suggestion server 400) on the integrated intelligence system 10. The communication circuit may transmit or receive data (or information) with an external server (e.g., the intelligence server 200, or the like) based on the wired or wireless communication. In various embodiments, the user terminal 100 may be referred to as an "electronic device" and may further include components of an electronic device 601 to be described through FIG. 6.

According to an embodiment, the input module 110 may receive a user input from a user. For example, the input module 110 may receive the user input from the connected external device (e.g., a keyboard or a headset). For another example, the input module 110 may include a touch screen (e.g., a touch screen display) coupled to the display 120. For another example, the input module 110 may include a hardware key (or a physical key) positioned in the user terminal 100 (or the housing of the user terminal 100).

According to an embodiment, the input module 110 may include a microphone that is capable of receiving the utterance of the user as a voice signal. For example, the input module 110 may include a speech input system and may receive the utterance of the user as a voice signal through the speech input system. For example, at least part of the microphone may be exposed through one portion (e.g., a first portion) of the housing. In an embodiment, the microphone may be controlled to operate when the microphone is controlled as being in an always-on state (e.g., always on) to receive an input (e.g., a voice input) according to a user utterance or may be controlled to operate when user manipulation provided to one region of the user terminal 100 is applied to a hardware key (e.g., 112 of FIG. 1C). The user manipulation may include press manipulation to the hardware key 112, press and hold manipulation to the hardware key 112.

According to an embodiment, the display 120 may display an image, a video, and/or an execution screen of an application. For example, the display 120 may display a graphic user interface (GUI) of an app. In an embodiment, at least part of the display 120 may be exposed through a portion (e.g., a second portion) of the housing to receive an input (e.g., a touch input or a drag input) by a user's body (e.g., a finger).

According to an embodiment, the speaker 130 may output the voice signal. For example, the speaker 130 may be generated inside the user terminal 100 or may output a voice signal received from an external device (e.g., the intelligence server 200 of FIG. 1A). According to an embodiment, the speaker 130 may be exposed through at least a portion (e.g., a third portion) of the housing in association with the efficiency of performing the above-described function.

According to an embodiment, the memory 140 may store a plurality of apps (or application program) 141 and 143. For example, the plurality of apps 141 and 143 may be a program for performing a function corresponding to the user input. According to an embodiment, the memory 140 may store an intelligence agent 145, an execution manager module 147, or an intelligence service module 149. For example, the intelligence agent 145, the execution manager module 147, and the intelligence service module 149 may be a framework (or application framework) for processing the received user input (e.g., user utterance).

According to an embodiment, the memory 140 may include a database capable of storing information necessary to recognize the user input. For example, the memory 140 may include a log database capable of storing log information. For another example, the memory 140 may include a persona database capable of storing user information.

According to an embodiment, the memory 140 may store the plurality of apps 141 and 143, and the plurality of apps 141 and 143 may be loaded to operate. For example, the plurality of apps 141 and 143 stored in the memory 140 may operate after being loaded by the execution manager module 147. The plurality of apps 141 and 143 may include execution service modules 141a and 143a performing a function. In an embodiment, the plurality of apps 141 and 143 may perform a plurality of actions (e.g., a sequence of states) 141b and 143b through execution service modules 141a and 143a for the purpose of performing a function. In other words, the execution service modules 141a and 143a may be activated by the execution manager module 147 of the processor 150, and then may execute the plurality of actions 141b and 143b.

According to an embodiment, when the actions 141b and 143b of the apps 141 and 143 are executed, an execution state screen according to the execution of the actions 141b and 143b may be displayed in the display 120. For example, the execution state screen may be a screen in a state where the actions 141b and 143b are completed. For another example, the execution state screen may be a screen in a state where the execution of the actions 141b and 143b is in partial landing (e.g., when a parameter necessary for the actions 141b and 143b are not entered).

According to an embodiment, the execution service modules 141a and 143a may execute the actions 141b and 143b depending on a path rule. For example, the execution service modules 141a and 143a may be activated by the execution manager module 147, may receive an execution request from the execution manager module 147 depending on the path rule, and may execute functions of the apps 141 and 143 by performing the actions 141b and 143b depending on the execution request. When the execution of the actions 141b and 143b is completed, the execution service modules 141a and 143a may transmit completion information to the execution manager module 147.

According to an embodiment, when the plurality of actions 141b and 143b are respectively executed in the apps 141 and 143, the plurality of actions 141b and 143b may be sequentially executed. When the execution of one action (e.g., action 1 of the first app 141 or action 1 of the second app 143) is completed, the execution service modules 141a and 143a may open the next action (e.g., action 2 of the first app 141 or action 2 of the second app 143) and may transmit the completion information to the execution manager module 147. Here, it is understood that opening an arbitrary action is to change a state of the arbitrary action to an executable state or to prepare the execution of the action. In other words, when the arbitrary action is not opened, the corresponding action may be not executed. When the completion information is received, the execution manager module 147 may deliver the execution request associated with the next action (e.g., action 2 of the first app 141 or action 2 of the second app 143) to the execution service modules 141a and 143a. According to an embodiment, when the plurality of apps 141 and 143 are executed, the plurality of apps 141 and 143 may be sequentially executed. For example, when receiving the completion information after the execution of the last action (e.g., action 3 of the first app 141) of the first app 141 is completed, the execution manager module 147 may transmit the execution request of the first action (e.g., action 1 of the second app 143) of the second app 143 to the execution service module 143a.

According to an embodiment, when the plurality of actions 141b and 143b are executed in the apps 141 and 143, the result screen according to the execution of each of the executed plurality of actions 141b and 143b may be displayed on the display 120. According to an embodiment, only a part of a plurality of result screens according to the executed plurality of actions 141b and 143b may be displayed on the display 120.

According to an embodiment, the memory 140 may store an intelligence app (e.g., a speech recognition app) operating in conjunction with the intelligence agent 145. The app operating in conjunction with the intelligence agent 145 may receive and process the utterance of the user as a voice signal. According to an embodiment, the app operating in conjunction with the intelligence agent 145 may be operated by a specific input (e.g., an input through a hardware key, an input through a touchscreen, or a specific voice input) input through the input module 110.

According to an embodiment, the intelligence agent 145, the execution manager module 147, or the intelligence service module 149 stored in the memory 140 may be performed by the processor 150. The functions of the intelligence agent 145, the execution manager module 147, or the intelligence service module 149 may be implemented by the processor 150. It is described that the function of each of the intelligence agent 145, the execution manager module 147, and the intelligence service module 149 is the operation of the processor 150. According to an embodiment, the intelligence agent 145, the execution manager module 147, or the intelligence service module 149 stored in the memory 140 may be implemented with hardware as well as software.

According to an embodiment, the processor 150 may control overall operations of the user terminal 100. For example, the processor 150 may control the input module 110 to receive the user input. The processor 150 may control the display 120 to display an image. The processor 150 may control the speaker 130 to output the voice signal. The processor 150 may control the memory 140 to execute a program and to read or store necessary information.

In an embodiment, the processor 150 may execute the intelligence agent 145, the execution manager module 147, or the intelligence service module 149 stored in the memory 140. As such, the processor 150 may implement the function of the intelligence agent 145, the execution manager module 147, or the intelligence service module 149.

According to an embodiment, the processor 150 may execute the intelligence agent 145 to generate an instruction for launching an app based on the voice signal received as the user input. According to an embodiment, the processor 150 may execute the execution manager module 147 to launch the apps 141 and 143 stored in the memory 140 depending on the generated instruction. According to an embodiment, the processor 150 may execute the intelligence service module 149 to manage information of a user and may process a user input, using the information of the user.

The processor 150 may execute the intelligence agent 145 to transmit a user input received through the input module 110 to the intelligence server 200 and may process the user input through the intelligence server 200.

According to an embodiment, before transmitting the user input to the intelligence server 200, the processor 150 may execute the intelligence agent 145 to pre-process the user input. According to an embodiment, to pre-process the user input, the intelligence agent 145 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input and may search for a part in which the user voice is present, by using the detected end-point. The AGC module may recognize the user input and may adjust the volume of the user input so as to be suitable to process the recognized user input. According to an embodiment, the processor 150 may execute all the pre-processing elements for performance. However, in another embodiment, the processor 150 may execute a part of the pre-processing elements to operate at low power.

According to an embodiment, the intelligence agent 145 may execute a wakeup recognition module stored in the memory 140 for the purpose of recognizing a call of a user. As such, the processor 150 may recognize the wakeup command of a user through the wakeup recognition module and may execute the intelligence agent 145 for receiving user input when receiving the wakeup command. The wakeup recognition module may be implemented with a low-power processor (e.g., a processor included in an audio codec). According to an embodiment, when receiving a user input through a hardware key, the processor 150 may execute the intelligence agent 145. When the intelligence agent 145 is executed, an intelligence app (e.g., a speech recognition app) operating in conjunction with the intelligence agent 145 may be executed.

According to an embodiment, the intelligence agent 145 may include a speech recognition module for performing the user input. The processor 150 may recognize the user input for executing an action in an app through the speech recognition module. For example, the processor 150 may recognize a limited user (voice) input (e.g., an utterance such as "click" for performing a capture operation when a camera app is being executed) for performing an action such as the wakeup command in the apps 141 and 143 through the speech recognition module. For example, the processor 150 may assist the intelligence server 200 to recognize and rapidly process a user command capable of being processed in the user terminal 100 through the speech recognition module. According to an embodiment, the speech recognition module of the intelligence agent 145 for executing a user input may be implemented in an app processor.

According to an embodiment, the speech recognition module (including the speech recognition module of a wake up module) of the intelligence agent 145 may recognize the user input, using an algorithm for recognizing a voice. For example, the algorithm for recognizing the voice may be at least one of a hidden Markov model (HMM) algorithm, an artificial neural network (ANN) algorithm, or a dynamic time warping (DTW) algorithm.

According to an embodiment, the processor 150 may execute the intelligence agent 145 to convert the voice input of the user into text data. For example, the processor 150 may transmit the voice of the user to the intelligence server 200 through the intelligence agent 145 and may receive the text data corresponding to the voice of the user from the intelligence server 200. As such, the processor 150 may display the converted text data in the display 120.

According to an embodiment, the processor 150 may execute the intelligence agent 145 to receive a path rule from the intelligence server 200. According to an embodiment, the processor 150 may transmit the path rule to the execution manager module 147 through the intelligence agent 145.

According to an embodiment, the processor 150 may execute the intelligence agent 145 to transmit the execution result log according to the path rule received from the intelligence server 200 to the intelligence service module 149, and the transmitted execution result log may be accumulated and managed in preference information of the user of a persona module 149b.

According to an embodiment, the processor 150 may execute the execution manager module 147, may receive the path rule from the intelligence agent 145, and may execute the apps 141 and 143; and the processor 150 may allow the apps 141 and 143 to execute the actions 141b and 143b included in the path rule. For example, the processor 150 may transmit command information (e.g., path rule information) for executing the actions 141b and 143b to the apps 141 and 143, through the execution manager module 147; and the processor 150 may receive completion information of the actions 141b and 143b from the apps 141 and 143.

According to an embodiment, the processor 150 may execute the execution manager module 147 to transmit the command information (e.g., path rule information) for executing the actions 141b and 143b of the apps 141 and 143 between the intelligence agent 145 and the apps 141 and 143. The processor 150 may bind the apps 141 and 143 to be executed depending on the path rule through the execution manager module 147 and may transmit the command information (e.g., path rule information) of the actions 141b and 143b included in the path rule to the apps 141 and 143. For example, the processor 150 may sequentially transmit the actions 141b and 143b included in the path rule to the apps 141 and 143, through the execution manager module 147 and may sequentially execute the actions 141b and 143b of the apps 141 and 143 depending on the path rule.

According to an embodiment, the processor 150 may execute the execution manager module 147 to manage execution states of the actions 141b and 143b of the apps 141 and 143. For example, the processor 150 may receive information about the execution states of the actions 141b and 143b from the apps 141 and 143, through the execution manager module 147. For example, when the execution states of the actions 141b and 143b are in partial landing (e.g., when a parameter necessary for the actions 141b and 143b are not input), the processor 150 may transmit information about the partial landing to the intelligence agent 145, through the execution manager module 147. The processor 150 may make a request for an input of necessary information (e.g., parameter information) to the user by using the received information through the intelligence agent 145. For another example, when the execution state of each of the actions 141b and 143b is an operating state, the processor 150 may receive an utterance from the user through the intelligence agent 145. The processor 150 may transmit information about the apps 141 and 143 being executed and the execution states of the apps 141 and 143 to the intelligence agent 145, through the execution manager module 147. The processor 150 may transmit the user utterance to the intelligence server 200 through the intelligence agent 145. The processor 150 may receive parameter information of the utterance of the user from the intelligence server 200 through the intelligence agent 145. The processor 150 may transmit the received parameter information to the execution manager module 147 through the intelligence agent 145. The execution manager module 147 may change a parameter of each of the actions 141b and 143b to a new parameter by using the received parameter information.

According to an embodiment, the processor 150 may execute the execution manager module 147 to transmit parameter information included in the path rule to the apps 141 and 143. In the case where the plurality of apps 141 and 143 are sequentially executed depending on the path rule, the execution manager module 147 may transmit the parameter information included in the path rule from one app to another app.

According to an embodiment, the processor may execute the execution manager module 147 to receive a plurality of path rules. The processor 150 may select a plurality of path rules based on the utterance of the user, through the execution manager module 147. For example, when the user utterance specifies a partial app 141 executing a partial action 141b but does not specify the other app 143 executing the remaining action 143b, the processor 150 may receive a plurality of different path rules, in which the same app 141 (e.g., gallery app) executing the partial action 141b is executed and in which the different app 143 (e.g., message app or Telegram app) executing the remaining action 143b is executed, through the execution manager module 147. For example, the processor 150 may execute the same actions 141b and 143b (e.g., the same successive actions 141b and 143b) of the plurality of path rules, through the execution manager module 150. In the case where the processor 150 executes the same action, the processor 150 may display a state screen for selecting the different apps 141 and 143 respectively included in the plurality of path rules in the display 120, through the execution manager module 153.

According to an embodiment, the intelligence service module 149 may include a context module 149a, a persona module 149b, or a suggestion module 149c.

The context module 149a may collect current states of the apps 141 and 143 from the apps 141 and 143. For example, the context module 149a may receive context information indicating the current states of the apps 141 and 143 to collect the current states of the apps 141 and 143.

The persona module 149b may manage personal information of the user utilizing the user terminal 100. For example, the persona module 149b may collect the usage information and the execution result of the user terminal 100 to manage personal information of the user.

The suggestion module 149c may predict the intent of the user to recommend a command to the user. For example, the suggestion module 149c may recommend a command to the user in consideration of the current state (e.g., a time, a place, a situation, or an app) of the user.

Figure 1C:
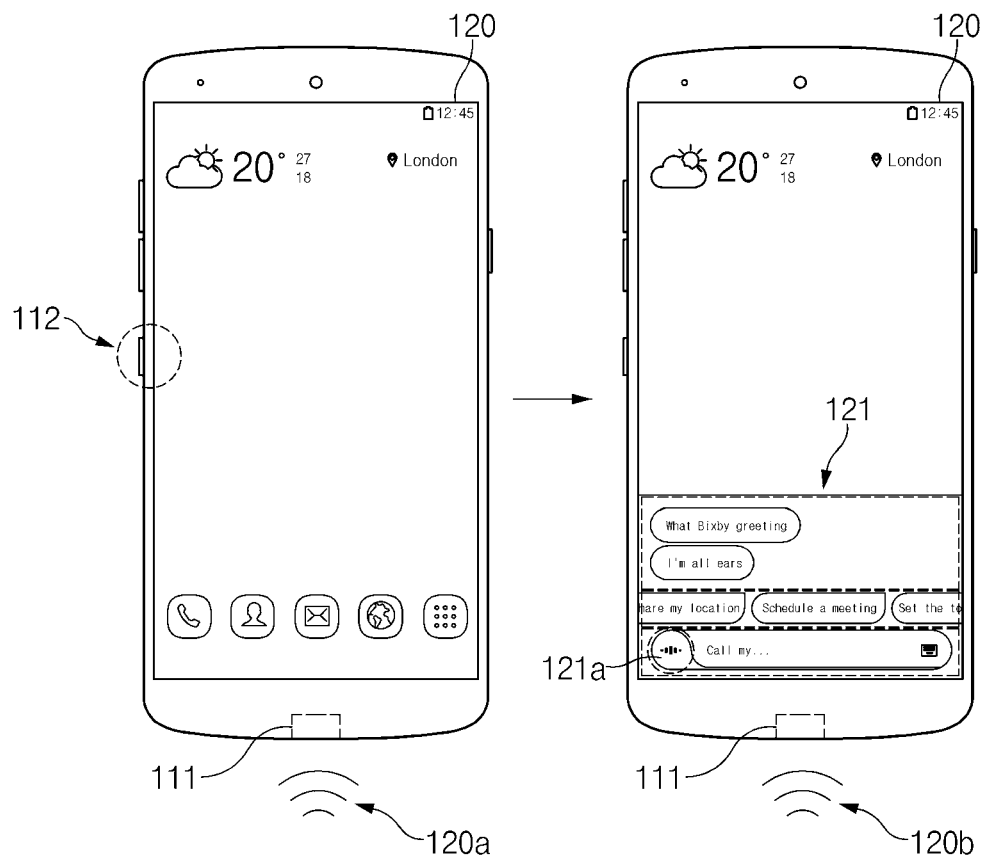
FIG. 1C is a diagram illustrating a form in which an intelligence app of a user terminal is executed, according to an embodiment.

FIG. 1C is a diagram illustrating a form in which an intelligence app of a user terminal is executed, according to an embodiment.

Referring to FIG. 1C, the user terminal 100 may include a hardware button 112 (or a button for sensing a user input (e.g., a touch)) functioning as an interface for receiving a user input. For example, the hardware button 112 may be disposed in an accessible region of the user's body (e.g. a finger) on the housing of the user terminal 100; at least part of the hardware button 112 may be exposed to the outside of the housing in association with performing a function (e.g., receiving or sensing a user input). In an embodiment, the user terminal 100 may receive (or sense) a user input applied to the hardware button 112 to execute an intelligence app (e.g., a speech recognition app) operating in conjunction with the intelligence agent 145 of FIG. 1B.

When the user terminal 100 receives the user input through the hardware key 112, the user terminal 100 may display a UI 121 of the intelligence app in the display 120. For example, a user may touch a speech recognition button 121*a* to the UI 121 of the intelligence app for the purpose of entering (120*b*) a voice in a state where the UI 121 of the intelligence app is displayed on the display 120. For another example, while continuously pressing the hardware key 112 to enter (120*a*) the voice, the user may enter (120*a*) the voice.

According to an embodiment, the user terminal 100 may execute the intelligence app through a microphone 111. For example, when a specified voice (e.g., wake up! or the like) is entered through the microphone 111, the user terminal 100 may display the UI 121 of the intelligence app on the display 120.

In various embodiments, the above-described hardware key 112 may be replaced with a sensor capable of sensing a touch input by at least part (e.g., finger) of the user's body or a sensing button including the sensor.

Figure 1D:
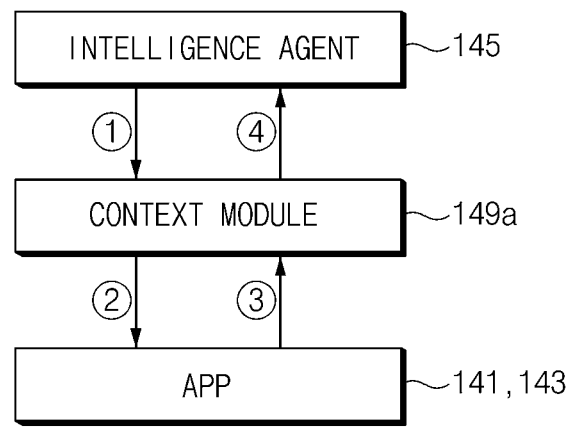
FIG. 1D is a diagram illustrating a form in which a state of a context module included in an intelligence service module is collected, according to an embodiment.

FIG. 1D is a diagram illustrating a form in which a state of a context module included in an intelligence service module is collected, according to an embodiment.

Referring to FIG. 1D, when receiving a context request from the intelligence agent 145 (①), the processor 150 may make a request for context information indicating the current state of apps 141 and 143 through the context module 149*a* (②). According to an embodiment, the processor 150 may receive the context information from the apps 141 and 143 (③) through the context module 149*a* and may transmit the context information to the intelligence agent 145 (④).

According to an embodiment, the processor 150 may receive pieces of context information from apps 141 and 143 through the context module 149*a*. The context information may be information about the most recently executed apps 141 and 143. For another example, the context information may be information (e.g., when a user watches a photo through a gallery app, information about the corresponding photo) bout the current states in the apps 141 and 143.

According to an embodiment, the processor 150 may receive context information indicating a current state of the user terminal 100 from a device platform as well as the apps 141 and 143, through the context module 149*a*. The context information may include general context information, user context information, or device context information.

The general context information may include general information of the user terminal 100. The general context information may be identified through an internal algorithm by receiving data through a sensor hub of the device platform or the like. For example, the general context information may include information about current time and space. For example, the information about the current time and space may include information about current time or a current location of the user terminal 100. The current time may be identified through the time on the user terminal 100, and the information about the current location may be identified through a global positioning system (GPS). For another example, the general context information may include information about physical motion. For example, the information about the physical motion may include information about walking, running, driving, or the like. The information about the physical motion may be identified through a motion sensor. The information about the driving may be identified by sensing Bluetooth connection in a vehicle such that boarding and parking is identified as well as identifying the driving through the motion sensor. For another example, the general context information may include user activity information. For example, the user activity information may include information about commuting, shopping, travel, or the like. The user activity information may be identified by using information about a place where a user or an app registers in a database.

The user context information may include information about the user. For example, the user context information may include information about an emotional state of the user. For example, the information about the emotional state of the user may include information about happiness, sadness, anger, or the like of the user. For another example, the user context information may include information about the current state of the user. For example, the information about the current state of the user may include information about interest, intent, or the like (e.g., shopping).

The device context information may include information about the state of the user terminal 100. For example, the device context information may include information about a path rule performed by the execution manager module 147. For another example, the device information may include information about a battery. For example, the information about the battery may be identified through charging and discharging states of the battery. For another example, the device information may include information about a connected device and a network. For example, the information about the connected device may be identified through a communication interface connected with the device.

Figure 1E:
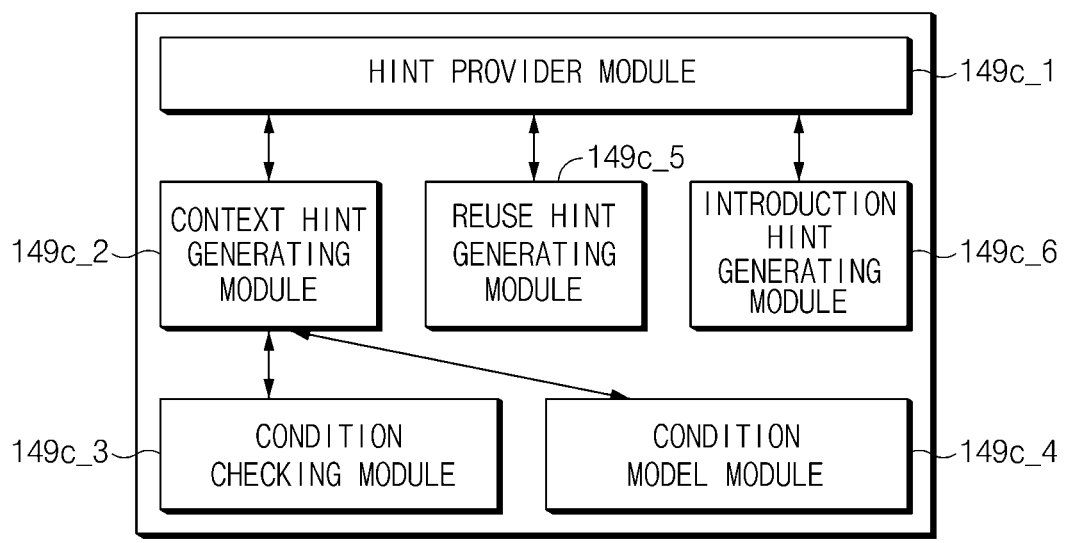
FIG. 1E is a diagram illustrating a suggestion module included in an intelligence service module, according to an embodiment.

FIG. 1E is a diagram illustrating a suggestion module included in an intelligence service module, according to an embodiment.

Referring to FIG. 1E, the suggestion module 149*c* may include a hint provider module 149*c*_1, a context hint generating module 149*c*_2, a condition checking module 149*c*_3, a condition model module 149*c*_4, a reuse hint generating module 149*c*_5, or an introduction hint generating module 149*c*_6.

According to an embodiment, the processor 150 may execute the hint provider module 149*c*_1 to provide a user with a hint. For example, the processor 150 may receive the generated hint from the context hint generating module 149*c*_2, the reuse hint generating module 149*c*_5 or the introduction hint generating module 149*c*_6 through the hint provider module 149*c*_1, to provide the user with the hint.

According to an embodiment, the processor 150 may execute the condition checking module 149*c*_3 or the condition model module 149*c*_4 to generate a hint capable of being recommended depending on the current state. The processor 150 may execute the condition checking module 149*c*_3 to receive information corresponding to the current state from the intelligence service module 149 and may execute the condition model module 149*c*_4 to set a condition model by using the received information. For example, the processor 150 may execute the condition model module 149*c*_4 to grasp a time, a location, a situation, an app being executed, or the like at a point in time when the hint is provided to the user, and thus may provide the user with a hint, which is likely to be used under the corresponding condition, in descending order of priority.

According to an embodiment, the processor 150 may execute the reuse hint generating module 149*c*_5 to generate a hint capable of being recommended depending on the usage frequency. For example, the processor 150 may execute the reuse hint generating module 149*c*_5 to generate the hint based on a usage pattern of the user.

According to an embodiment, the introduction hint generating module 149c_6 may generate a hint for introducing a new function and a function, which is most frequently used by another user, to the user. For example, the hint for introducing the new function may include introduction (e.g., an operating method) associated with the intelligence agent 145.

According to another embodiment, the personalization information server 300 may include the context hint generating module 149c_2, the condition checking module 149c_3, the condition model module 149c_4, the reuse hint generating module 149c_5, or the introduction hint generating module 149c_6 of the suggestion module 149c. Accordingly, the processor 150 may receive a hint (or natural language expression) from the personalization information server 300 through the hint provider module 149c_1 of the suggestion module 149c and then may provide the received hint to the user.

In association with the contents curation service operation of the user terminal 100 to be described below, the processor 150 may receive and utilize a hint (or natural language expression) from a part of components (e.g., the context hint generating module 149c_2, the condition checking module 149c_3, the condition model module 149c_4, the reuse hint generating module 149c_5, or the introduction hint generating module 149c_6) included in the user terminal 100 or the personalization information server 300. Hereinafter, various embodiments regarding the contents curation service operation will be described based on the reception of a hint from the personalization information server 300. However, the disclosure is not limited thereto; as described above, it may be apparent that a hint used for the contents curation service operation may be obtained from the component in the user terminal 100. Furthermore, in the case of receiving the hint from the personalization information server 300, at least one information (e.g., app state information, user information, state information of the user terminal 100, or the like) referenced in the generation of the hint may be shared from the user terminal 100 to the personalization information server 300 or may be synchronized between the user terminal 100 and the personalization information server 300.

According to an embodiment, the user terminal 100 may provide the hint depending on the following series of processes. For example, when receiving a hint providing request from the intelligence agent 145, the processor 150 may transmit the hint generating request to the context hint generating module 149c_2 through the hint provider module 149c_1. When receiving the hint generating request, the processor 150 may receive information corresponding to the current state from the context module 149a and the persona module 149b through the condition checking module 149c_3. The processor 150 may transmit the received information to the condition model module 149c_4 through the condition checking module 149c_3, and may assign a priority to a hint among hints to be provided to the user, in order of high availability under a condition by using the information through the condition model module 149c_4. The processor 150 may identify (⑥) the condition through the context hint generating module 149c_2 and may generate a hint corresponding to the current state. The processor 150 may transmit the generated hint to the hint provider module 149c_1 through the context hint generating module 149c_2. The processor 150 may sort the hint depending on the specified rule through the hint provider module 149c_1 and may transmit the hint to the intelligence agent 145.

According to an embodiment, the processor 150 may generate a plurality of context hints through the hint provider module 149c_1 and may assign priorities to the plurality of context hints depending on the specified rule. According to an embodiment, the processor 150 may provide the user with a context hint, the priority of which is high, from among the plurality of context hints at first through the hint provider module 149c_1.

According to an embodiment, the user terminal 100 may suggest a hint according to the use frequency. For example, when receiving a hint providing request from the intelligence agent 145, the processor 150 may transmit the hint generating request to the reuse hint generating module 149c_5 through the hint provider module 149c_1. When receiving the hint generating request, the processor 150 may receive user information from the persona module 149b through the reuse hint generating module 149c_5. For example, the processor 150 may receive a path rule included in preference information of the user of the persona module 149b, a parameter included in the path rule, an execution frequency of an app, and information about time and space in which the app is used, through the reuse hint generating module 149c_5. The processor 150 may generate a hint corresponding to the received user information, through the reuse hint generating module 149c_5. The processor 150 may transmit the generated hint to the hint provider module 149c_1 through the executed reuse hint generating module 149c_5. The processor 150 may sort the hint through the hint provider module 149c_1 and may transmit the hint to the executed intelligence agent 145.

According to an embodiment, the user terminal 100 may suggest a hint associated with a new function. For example, when receiving a hint providing request from the executed intelligence agent 145, the processor 150 may transmit the hint generating request to the introduction hint generating module 149c_6 through the hint provider module 149c_1. The processor 150 may transmit an introduction hint providing request to the suggestion server 400 and may receive information about a function to be introduced from the suggestion server 400, through the introduction hint generating module 149c_6. For example, the suggestion server 400 may store the information about the function to be introduced, and a hint list associated with the function to be introduced may be updated by a service operator. The processor 150 may transmit the generated hint to the hint provider module 149c_1 through the executed introduction hint generating module 149c_6. The processor 150 may sort the hint through the hint provider module 149c_1 and may transmit the hint to the executed intelligence agent 145.

As such, the processor 150 may provide a user with a hint generated by the context hint generating module 149c_2, the reuse hint generating module 149c_5, or the introduction hint generating module 149c_6, through the suggestion module 149c. For example, the processor 150 may display the generated hint in an app operating the intelligence agent 145 through the suggestion module 149c and may receive an input for selecting the hint from the user through the app.

Figure 1F:
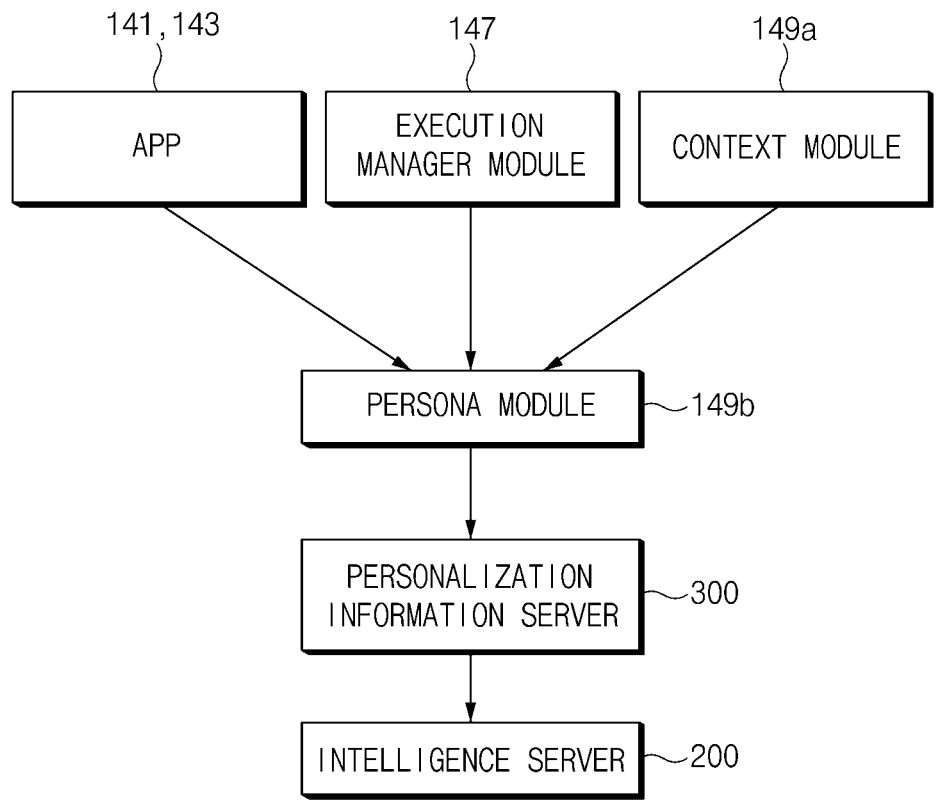
FIG. 1F is a diagram illustrating a user information management form of a persona module included in an intelligence service module, according to an embodiment.

FIG. 1F is a diagram illustrating a user information management form of a persona module included in an intelligence service module, according to an embodiment.

Referring to FIG. 1F, the processor 150 may receive information of the user terminal 100 from the apps 141 and 143, the execution manager module 147, or the context module 149a through the persona module 149b. The processor 150 may store information about the result obtained by executing the actions 141b and 143b of an app in an action log database through the apps 141 and 143 and the execution manager module 147. The processor 150 may store information about a current state of the user terminal 100 in a context database through the context module 149a. The processor 150 may receive the stored information from the action log database or the context database through the persona module 149b. For example, data stored in the action log database and the context database may be analyzed by an analysis engine and may be transmitted to the persona module 149b.

According to an embodiment, the processor 150 may transmit information received from the apps 141 and 143, the execution manager module 147, or the context module 149a to the executed suggestion module 149c through the persona module 149b. For example, the processor 150 may transmit the data stored in the action log database or the context database to the suggestion module 149c through the persona module 149b.

According to an embodiment, the processor 150 may transmit information received from the apps 141 and 143, the execution manager module 147, or the context module 149a to the personalization information server 300 through the persona module 149b. For example, the processor 150 may periodically transmit the data, which is accumulated and stored in the action log database or the context database, to the personalization information server 300 through the persona module 149b.

According to an embodiment, the processor 150 may transmit the data stored in the action log database or the context database to the executed suggestion module 149c through the persona module 149b. The user information generated through the persona module 149b may be stored in a persona database. The persona module 149b may periodically transmit the user information stored in the persona database to the personalization information server 300. According to an embodiment, the information transmitted to the personalization information server 300 through the persona module 149b may be stored in the persona database. The personalization information server 300 may infer user information necessary to generate a path rule of the intelligence server 200 by using the information stored in the persona database.

According to an embodiment, the user information inferred by using the information transmitted through the persona module 149b may include profile information or preference information. The profile information or the preference information may be inferred through an account of the user and accumulated information.

The profile information may include personal information of the user. For example, the profile information may include demographic information of the user. For example, the demographic information may include gender, age, or the like of the user. For another example, the profile information may include life event information. For example, the life event information may be inferred by comparing log information with a life event model and may be reinforced by analyzing a behavior pattern. For another example, the profile information may include interest information. For example, the interest information may include shopping items of interest, interesting fields (e.g., sports, politics, and the like). For another example, the profile information may include activity area information. For example, the activity area information may include information about a house, a work place, or the like. The information about the activity area may include information about an area where a priority is recorded based on accumulated stay time and the number of visits as well as information about a location of a place. For another example, the profile information may include activity time information. For example, the activity time information may include information about a wakeup time, a commute time, a sleep time, or the like. The information about the commute time may be inferred by using the activity area information (e.g., information about a house and a workplace). The information about the sleep time may be inferred through an unused time of the user terminal 100.

The preference information may include preference information of the user. For example, the preference information may include information about app preference. For example, the app preference may be inferred through a usage log (e.g., a time- and place-specific usage log) of an app. The app preference may be used to determine an app to be executed depending on a current state (e.g., time or place) of the user. For another example, the preference information may include information about contact preference. For example, the contact preference may be inferred by analyzing information about a contact frequency (e.g., a time- and place-specific frequency of contacting) of a contact. The contact preference may be used to determine a contact to be contacted depending on a current state (e.g., a contact for duplicate names) of the user. For another example, the preference information may include setting information. For example, the setting information may be inferred by analyzing information about setting frequency (e.g., a time- and place-specific frequency of setting a setting value) of a specific setting value. The setting information may be used to set a specific setting value depending on the current state (e.g., a time, a place, or a situation) of the user. For another example, the preference information may include place preference. For example, the place preference may be inferred through visit history (e.g., a time-specific visit history) of a specific place. The place preference may be used to determine a place to visit depending on the current state (e.g., time) of the user. For another example, the preference information may include instruction preference. For example, the instruction preference may be inferred through a usage frequency (e.g., a time- and place-specific usage frequency) of an instruction. The instruction preference may be used to determine an instruction pattern to be used depending on the current state (e.g., time or place) of the user. In particular, the instruction preference may include information about a menu most frequently selected by the user in the current state of an app being executed by analyzing the log information.

Figure 2:
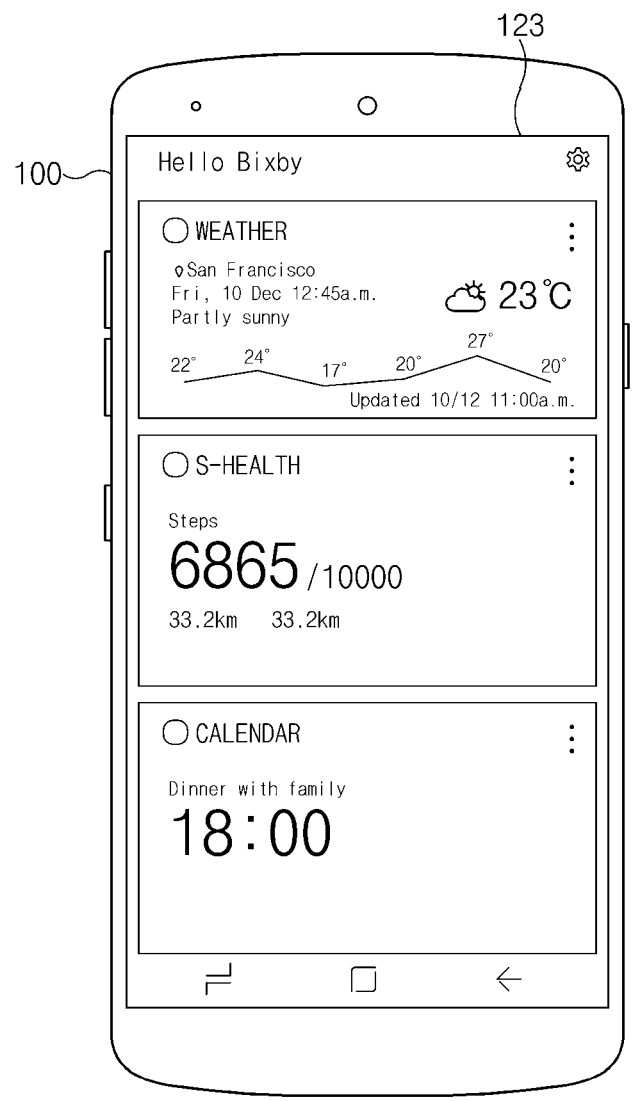
FIG. 2 is a diagram illustrating an example of an operation of a user terminal, according to an embodiment.

FIG. 2 is a diagram illustrating an example of an operation of a user terminal, according to an embodiment.

According to an embodiment, the user terminal 100 may operate a contents curation service (or contents curation program, it is referred to as "Hello Bixby" in the drawing referenced in the disclosure) based on the execution of a specific application. In various embodiments, the contents curation service (or contents curation program) may be operated through the above-described intelligence app, may be a program included in the intelligence app, or may be referred to as another name of the intelligence app.

Referring to FIG. 2, for example, various types of contents may be included in the interface 123 (hereinafter referred to as a first interface) functioning as an operating platform of the contents curation service, in the form of a card. In various embodiments, the first interface 123 may include the function (e.g., the function with high operation frequency) associated with at least one app mounted or installed in the user terminal 100 or information (e.g., schedule information or alarm information) or may include Information (e.g., news, stocks, weather, or the like) obtainable through a web browser (or an external server). Alternatively, the first interface 123 may include general context information, user context information, or device context information described above with reference to FIG. 1D; furthermore, the first interface 123 may include information (e.g., transportation information according to time information or spatial information) associated with the pieces of context information.

In an embodiment, the processor 150 of FIG. 1B of the user terminal 100 may build the first interface 123 based on information resources (e.g., information associated with a user or the operation of the user terminal 100) obtainable from at least one of the context module 149a of FIG. 1B, the persona module 149b of FIG. 1B, the personalization information server 300 of FIG. 1A, and the suggestion server 400 of FIG. 1A. Alternatively, the processor 150 may build the first interface 123 by receiving content information from at least one external server that affiliates to the contents curation service.

In various embodiments, at least one content included in the first interface 123 may be personalized depending on the user's preference or interest. For example, the at least one content on the first interface 123 may be classified, removed, rearranged, shared, or fixed in response to user control. When the processor 150 obtains or receives new content information or when a change on the first interface 123 occurs depending on the user control, the processor 150 may update the first interface 123, in real time or depending on the scheduled (or specified) period.

In an embodiment, the first interface 123 may be output (or called) based on the user input applied to the hardware button 112 of FIG. 1C described above. In other words, it may be understood that the user's manipulation to the hardware button 112 is the intent for the operation of the speech recognition service or the operation of the contents curation service through the intelligence app. Accordingly, the processor 150 may analyze a type (or input value) of user input to the hardware button 112 and then may support a service corresponding to the type (or input value) of the user input. For example, when the processor 150 receives a first type of user input (e.g., press hold) via the hardware button 112, the processor 150 may activate (or start) the speech recognition service operation and may activate the operation of the contents curation service for the second type of user input (e.g., double press).

In various embodiments, the processor 150 may exclude the discrimination of the first type or the second type of the user input and may support the speech recognition service or the contents curation service for any type of user input applied to the hardware button 112. In this regard, the processor 150 may identify the context for the user terminal 100 at the time of receiving the arbitrary type of user input. For example, the processor 150 may identify the screen being displayed on the display 120 at the time of receiving of the user input and may support the service operated relatively frequently among the speech recognition service and the contents curation service with reference to the history of the service operated on the corresponding screen. In a context similar to the example described above, the processor 150 may support the service (or frequently operated) corresponding to the location, time, running app, or the like of the user terminal 100 identified at the time of receiving the user input.

In various embodiments, the activation of the contents curation service may be implemented in various manners in addition to the user input to the hardware button 112. For example, the processor 150 may activate (or output the first interface 123) the contents curation service, in response to a user input (e.g., press hold) applied to a home button, a user input (e.g., swipe down or swipe side) applied to the display 120 on a home screen, or a user input (e.g., voice input) according to a specified user utterance (e.g., Hello Bixby).

Figure 3:
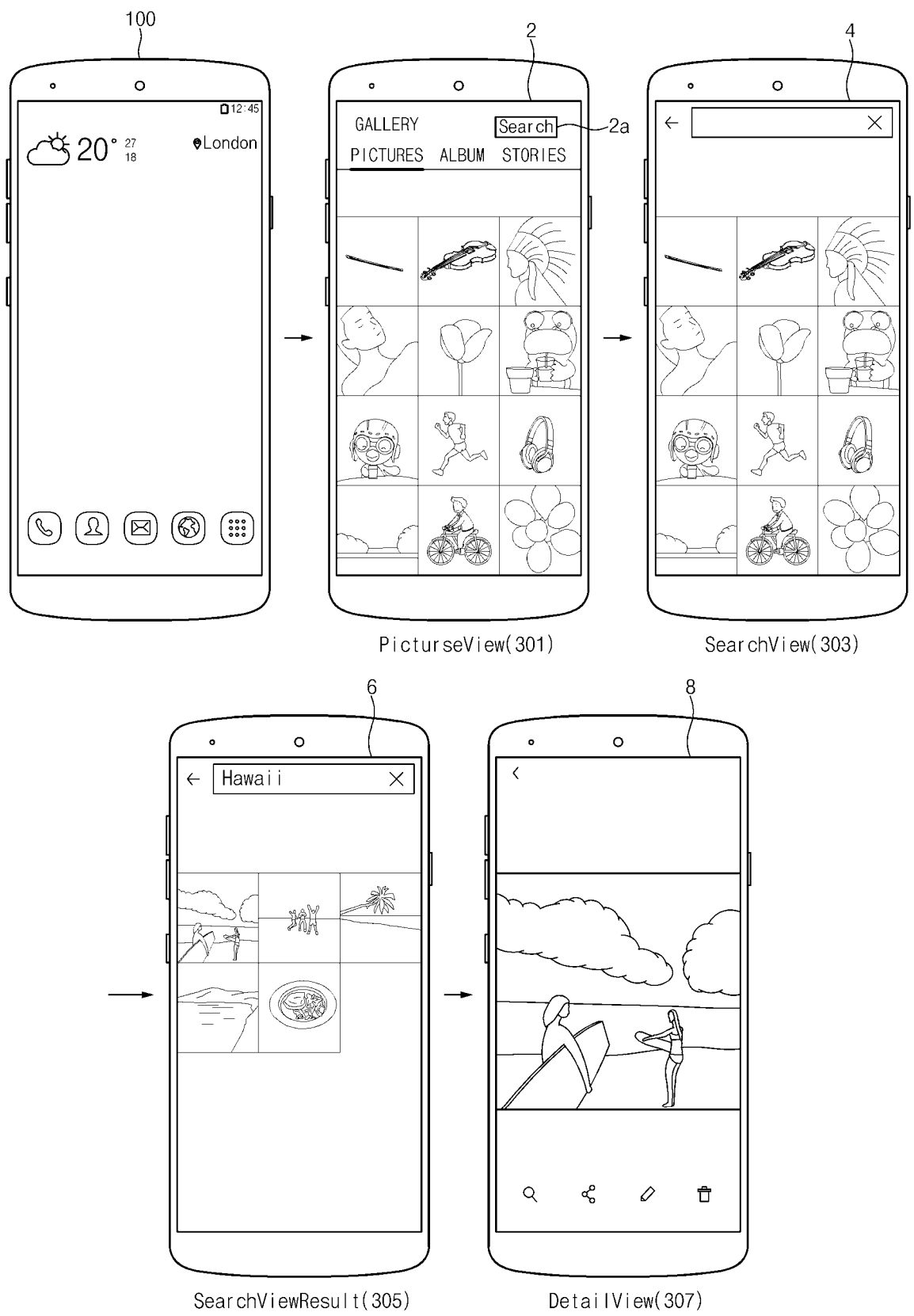
FIG. 3 is a diagram illustrating various states associated with an application operation of a user terminal, according to an embodiment.

FIG. 3 is a diagram illustrating various states associated with an application operation of a user terminal, according to an embodiment.

According to an embodiment, when performing a specific operation (e.g., app execution, function control, or the like) in response to user control, the processor 150 in FIG. 1B of the user terminal 100 in FIG. 1B may display various screens corresponding to the operation on the display 120 of FIG. 1B or may perform the switch from the output screen to another screen. In an embodiment, the screens displayed on the display 120 may be divided into different states; each state may include a unique state identification (ID) (or state information). In various embodiments, the state ID may be referred to as an identifier corresponding to the corresponding screen or may be included as at least part of identifier information corresponding to the corresponding screen.

In association with the above descriptions, referring to FIG. 3, for example, when the execution of the gallery app is controlled from the user, the processor 150 may output a first state 2 (e.g., gallery app execution screen) having a first state ID 301 (e.g., PicturesView). Referring to the various states capable of being associated from the first state 2, when a user input is applied to the search button 2a (e.g., Search) included in the first state 2, the processor 150 may output a second state 4 (e.g., photo search screen) having a second state ID 303 (e.g., SearchView). The processor 150 may output a third state 6 (e.g., search result screen) having a third state ID 305 (e.g., SearchViewResult) in response to a search word (e.g., Hawaii) input on the second state 4 from the user; when a specific photo is selected from the user on the third state 6, the processor 150 may output a fourth state 8 (e.g., photo magnification screen) having a fourth state ID 307 (e.g., Detail View). Accordingly, it may be understood that the specific screen displayed through the display 120 is in a specific state having a unique state ID.

TABLE 1

| | State Number | | | |
|---|---|---|---|---|
| | State 1 | State 2 | State 3 | State 4 |
| StateID Parameter | PicturesView | SearchView | SearchViewResult location poi tag title country time | DetailView |

The Table 1 may indicate an exemplary form of a parameter included in at least part of the first to fourth states described above. In an embodiment, the parameter may mean information resources required to express a state. For example, the above-described search word (e.g., Hawaii) may correspond to a parameter included in the third state 6, as the information required to express (or output) the third state 6 having the third state ID 305 (e.g., SearchViewResult). In other words, for the purpose of being transitioned from the second state 4 having the second state ID 303 (e.g., SearchView) to the third state 6 of the next array, the input (e.g., a voice input, a typing input, or the like) of a parameter (e.g., a location, POI, a tag, a title, a country, a time, or the like) included in the third state 6 may be required in the second state 4. In an embodiment, the respective at least one state involved in performing the specific operation (e.g., app execution and function control) of the user terminal 100 may include at least one parameter. For example, the state may include an optional parameter capable of being additionally utilized and a mandatory parameter (e.g., a parameter required to be transitioned to an array state) capable of being required necessarily, in expressing the corresponding state.

Figure 4A:
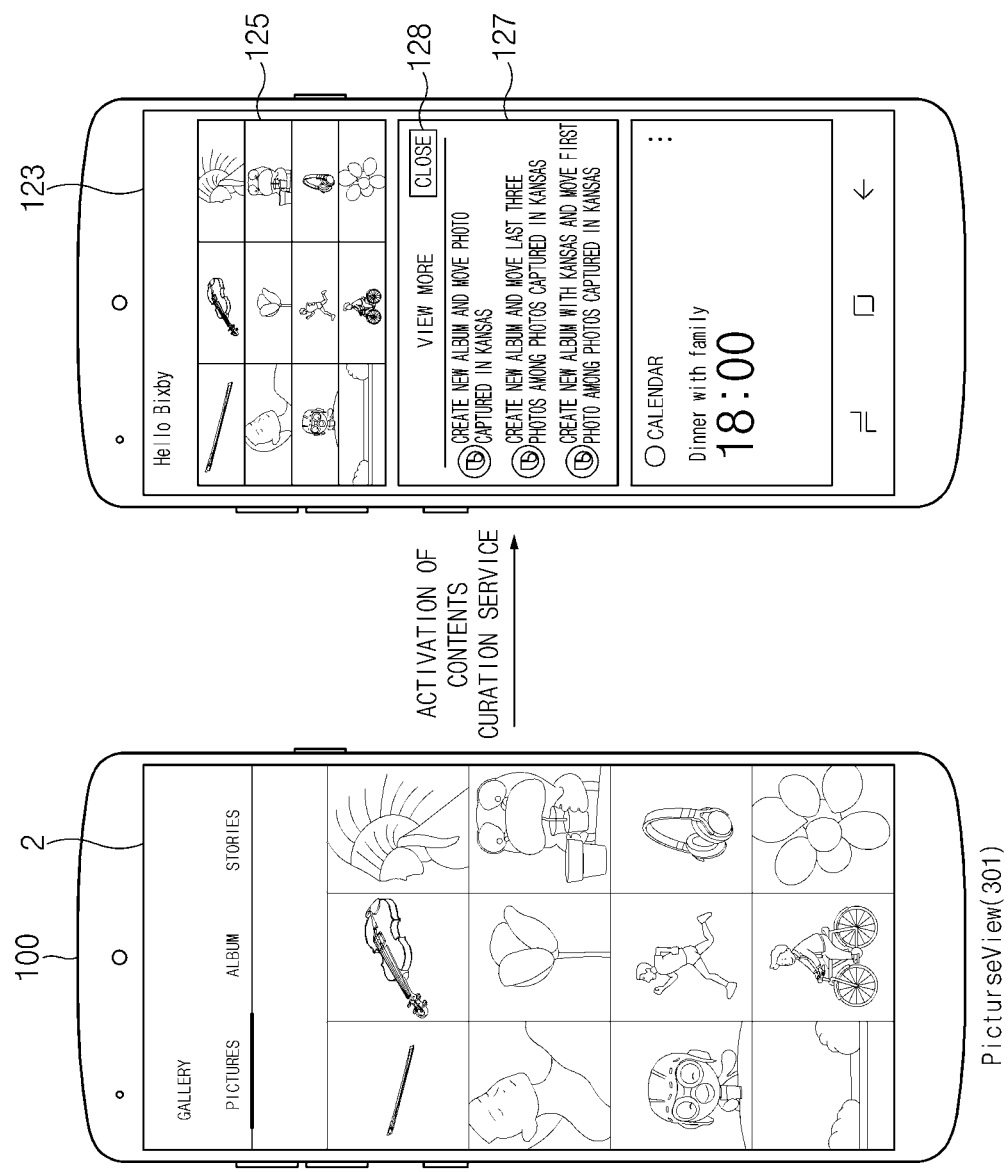
FIG. 4A is a diagram illustrating a form of a contents curation service activated from a first state of a user terminal, according to an embodiment.
Figure 4B:
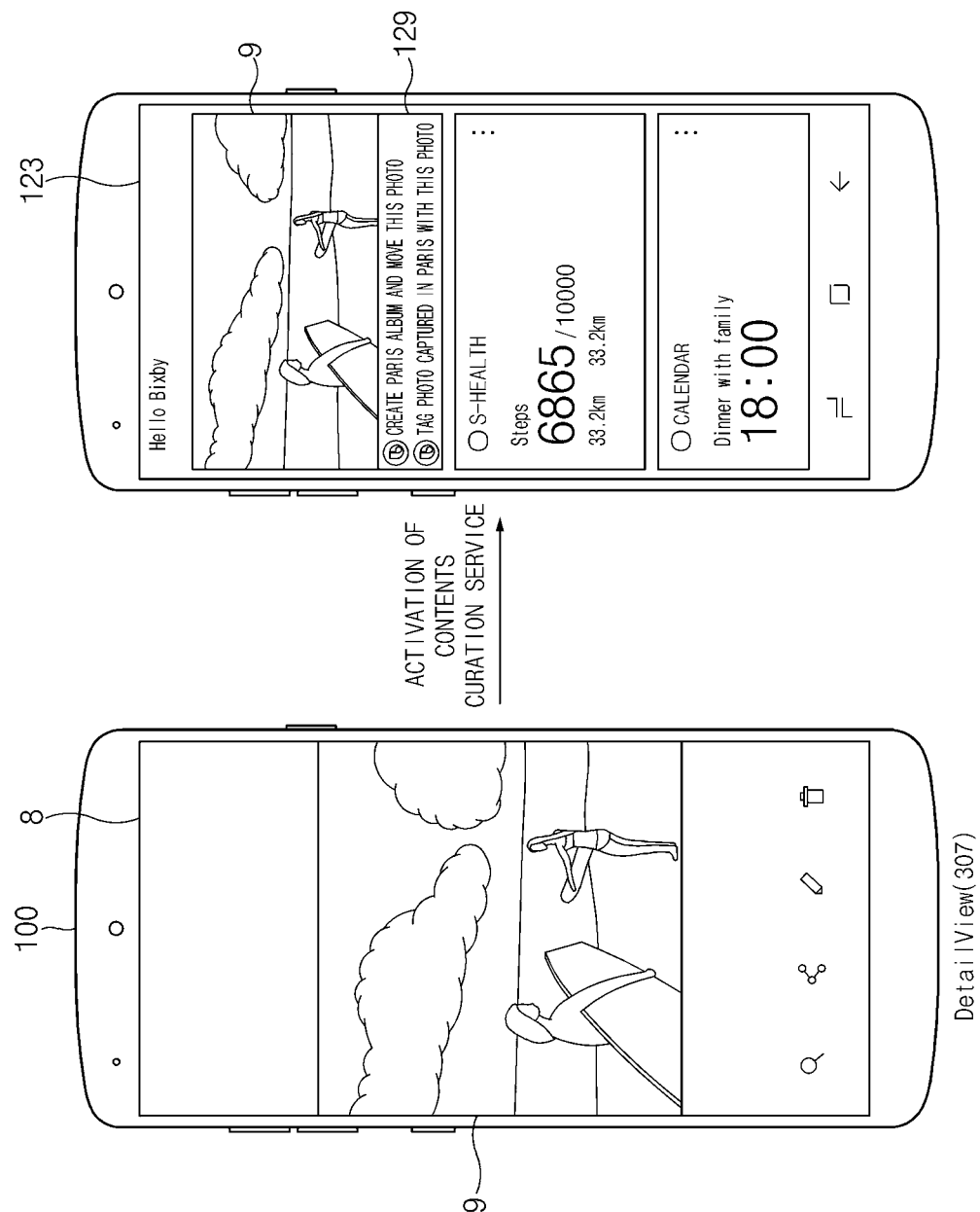
FIG. 4B is a diagram illustrating a form of a contents curation service activated from a second state of a user terminal, according to an embodiment.

FIGS. 4A, 4B and 4C are diagrams illustrating forms of contents curation services activated from various states of a user terminal, according to an embodiment. The text illustrated in FIG. 4A, 4B, or 4C may be in an exemplary form and may be variously modified depending on embodiments for the text display to be described later.

According to an embodiment, the processor 150 of FIG. 1B of the user terminal 100 of FIG. 1B may provide at least one content associated with the activation (or operation) of the speech recognition service, based on the first interface 123 of FIG. 2 (or the first interface according to the execution of a contents curation app) functioning as an operating platform of the contents curation service.

In association with the above descriptions, referring to FIG. 4A, the processor 150 may identify a state 2 of the user terminal 100 (e.g., a gallery app execution screen) at a point in time when the contents curation service is activated (or a point in time when the first interface is output depending on a user input applied to the hardware button 112). The processor 150 may load and obtain information (e.g., a state ID 301 (PicturesView)) (or the identifier of a state) associated with the identified state from the memory 140 of FIG. 1B and may transmit the obtained information to the intelligence server 200 of FIG. 1A in the integrated intelligence system 10 of FIG. 1A. In this operation, the processor 150 may determine whether the state of the user terminal 100 is associated with the home screen of the user terminal 100. When the identified state is associated with the home screen (e.g., when the state ID or identifier of the identified state corresponds to the home screen), the processor 150 may exclude information transmission to the intelligence server 200.

In an embodiment, the processor 150 may receive a hint (or natural language expression) corresponding to the state related information (or the identifier of a state) from the intelligence server 200. For example, it may be understood that the hint is a text corresponding to at least some utterances of user utterances that have occurred in the same state as the identified state in the past. In this regard, upon occurring a user utterance, the processor 150 may transmit state related information (e.g., the state ID or the identifier of a state) at the user utterance occurrence time to the intelligence server 200 in addition to the data of the user input (e.g., voice input) according to the user utterance; the intelligence server 200 may map the received data to the state related information to store the mapped result as history information. The functional operation of the intelligence server 200 associated with the hint provision will be described later.

In an embodiment, the processor 150 may output the first interface 123 in the overlaid form on the state 2 (e.g., a gallery app execution screen) identified depending on the activation of the contents curation service. At this time, the processor 150 may include a thumbnail image 125 of the state 2 (e.g., a gallery app execution screen) identified as a region of the first interface 123 and a hint 127 (or a natural language expression) received from the intelligence server 200. In various embodiments, a region (e.g., a region of the hint 127) of the first interface 123 may include a button 128 (e.g., close or 'X') for excluding the display of the hint 127 on the first interface 123.

Referring to FIG. 4B as an embodiment for another state of the user terminal 100, the state of the user terminal 100 identified at the time at which the contents curation service is activated may be a state linked (e.g., see the linkage structure between a first state (e.g., gallery app execution screen), a second state (e.g., photo search screen), a third state (e.g., search result screen), and a fourth state (e.g., photo magnification screen) described above) with at least another state.

In an embodiment, a state 8 (e.g., photo magnification screen) of the user terminal 100 identified by the processor 150 may include the single specific content 9 (e.g., photo). In this case, the processor 150 may transmit information (e.g., state ID 307 (DetailView)) associated with the identified state 8 (e.g., photo magnification screen) and attribute information (e.g., meta data) of the specific content, to the intelligence server 200. For example, when the location information is included as the attribute information of the specific content, the processor 150 may transmit the state related information (e.g., the state ID 307) and attribute information (e.g., location information), to the intelligence server 200 and may receive a hint (or natural language expression) corresponding to the state related information (e.g., the state ID 307) and the attribute information (e.g., location information) from the intelligence server 200. Accordingly, the processor 150 may include the hint 129 corresponding to the specific content 9 (e.g., photo) included in the state 8 (e.g., photo magnification screen) identified as a region of the first interface 123, the state related information (e.g., the state ID 307), and the attribute information (e.g., location information).

In various embodiments, the processor 150 may receive a hint corresponding to the previous state (e.g., the third state (search result screen)) of the identified state 8 (e.g., photo magnification screen), from the intelligence server 200 so as to include the hint in one region of the first interface 123. In this regard, there is no history information of a user utterance, which has occurred in the same state as the state 8 (e.g., photo magnification screen) identified by the user terminal 100, on the intelligence server 200; alternatively, the cumulative number of user utterances (or the frequency of occurrences) that occurred in the identified state 8 (e.g., photo magnification screen) may not be greater than the specified threshold value. In this case, the processor 150 may receive at least one hint corresponding to the previous state (e.g., the third state (search result screen)) of the identified state 8 (e.g., photo magnification screen) from the intelligence server 200 so as to include the hint in the first interface 123.

Referring to details described through Table 1, the respective at least one state involved in the specific operation (e.g., app execution and function control) of the user terminal 100 may include a parameter. Accordingly, the user utterance occurring in the respective at least one state may include at least one parameter included in the corresponding state. In other words, the hint in which the user utterance occurring in the specific state is displayed in text form may include a word, a phrase, or a morpheme for at least one parameter corresponding to the state of the identified user terminal 100. According to an embodiment, the word, phrase, or morpheme for various types of parameters may be applied to the hint with regard to the transition between states. However, the variety of types of parameters for the state identified in the execution operation of a specific app may be limited. For example, the user utterance occurring in the state 11 (e.g., call incoming screen) identified as shown in FIG. 4C may be relatively limited to the user utterance occurring in the state according to another app, and thus the type of parameter corresponding to the identified state 11 (e.g., call incoming screen) may also be limited. In this case, the processor 150 may receive at least one hint 131 configured to include a word, a phrase, or a morpheme (e.g., block, add, record, or the like) for parameters separated from each other, from the intelligence server 200 and then may include the at least one hint 131 in the first interface 123.

In various embodiments, in addition to the app (e.g., a gallery app or a call app) described with reference to FIG. 4A, 4B, or 4C, an app associated with the state of the user terminal 100 may include various apps. With regard to the state identified in the execution operation of the various apps, the processor 150 may receive various aspects of hints from the intelligence server 200.

For example in association with the above-described details, with regard to the operation of the camera app installed in the user terminal 100, when a user utterance that occurred frequently in the past is associated with the ratio control of the shot image, the processor 150 may receive at least one hint (e.g., please capture an image at a ratio of 3:4, please capture an image at a ratio of 16:9, or the like) associated with the image ratio control from the intelligence server 200. Furthermore, in the case where the user utterance associated with the shooting image ratio control heavily occurs in a specific place (e.g., in the case where a place where an image is captured at a ratio of 3:4 is mostly a house), when it is determined that a user or the user terminal 100 is located at the specific location, the processor 150 may receive a hint (e.g., please capture an image at a ratio of 3:4) corresponding to the specific location from the intelligence server 200. In various embodiments, the user utterance occurring heavily may mean a user utterance occurring as the frequency of occurrences exceeds a specified threshold value or may mean a user utterance occurring most frequently among at least one user utterance.

For another example, with regard to the operation of the message app, the music app, or the like installed in the user terminal 100, the processor 150 may receive at least one hint according to the operation time information of the corresponding app, from the intelligence server 200. For example, when the messaging app or music app is operated to transmit a message to a first recipient at a first time or to play a first playlist, the processor 150 may receive a hint (e.g., send a message to my wife, play the latest music, or the like) associated with transmitting a message from the intelligence server 200 to the first recipient (e.g., a wife) or playing the first playlist (e.g., latest music) during only the first time.

In an embodiment, when a user input (e.g., touch) is applied to any one of at least one hint included in the first interface 123 described above, the processor 150 may activate the speech recognition service, by transmitting information about the selected hint to the intelligence server 200 and executing an intelligence app to perform a functional operation (or task) corresponding to the selected hint. Moreover, the processor 150 may receive a path rule for performing a functional operation corresponding to the selected hint from the intelligence server 200.

In various embodiments, the first interface 123 may include an object (e.g., an icon, a button, a tab, or the like) capable of controlling the activation of the speech recognition service. For example, when at least one hint included in the first interface 123 is not selected from the user, the object may function as the means for activating a speech recognition service. Alternatively, in response to a specified user utterance (e.g., Hello Bixby) occurring in a state where the first interface 123 is outputting, or the button operation (e.g., press hold) of the hardware 112 in FIG. 1C of the user, the processor 150 may activate a speech recognition service.

Hereinafter, in FIGS. 5A and 5B, the configuration and function execution of the intelligence server, which may be referenced in association with the processing of hint information received by the intelligence server from the user terminal, will be described.

Figure 5A:
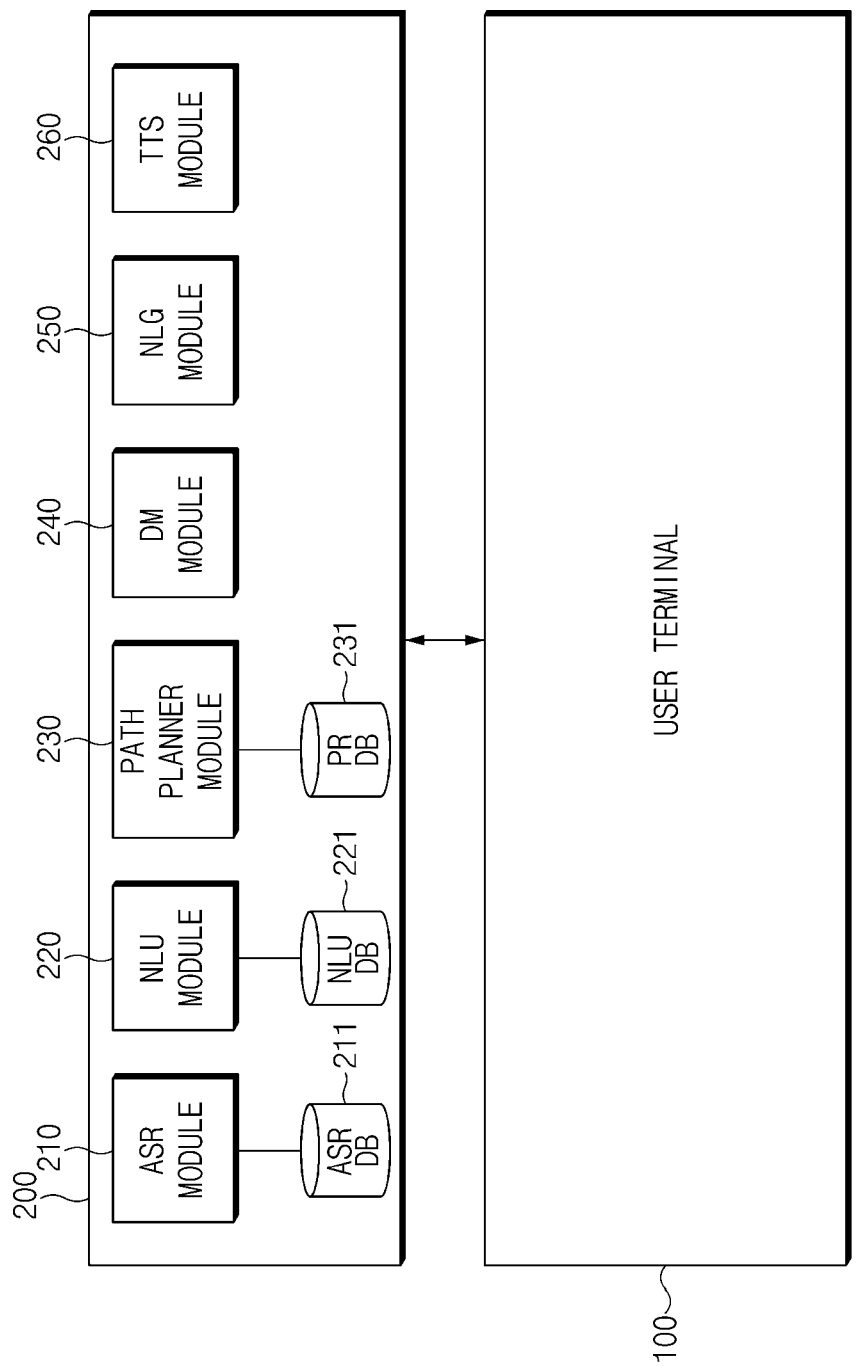
FIG. 5A is a diagram illustrating an intelligence server of an integrated intelligence system, according to an embodiment.

FIG. 5A is a diagram illustrating an intelligence server of an integrated intelligence system, according to an embodiment.

Referring to FIG. 5A, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260. In various embodiments, the components (e.g., the ASR module 210, the NLU module 220, the path planner module 230, the DM module 240, the NLG module 250, or the TTS module 260) of the intelligence server 200 described above may be implemented individually or at least part of the components may be implemented integrally. According to an embodiment, the intelligence server 200 may include a communication circuit, a memory, and a processor. The processor may execute an instruction stored in the memory to drive the ASR module 210, the NLU module 220, the path planner module 230, the DM module 240, the NLG module 250, and the TTS module 260. The intelligence server 200 may transmit or receive data (or information) to or from an external electronic device (e.g., the user terminal 100) through the communication circuit.

The NLU module 220 or the path planner module 230 of the intelligence server 200 may generate a path rule.

According to an embodiment, the ASR module 210 may convert the user input received from the user terminal 100 to text data. For example, the ASR module 210 may include a speech recognition module. The speech recognition module may include an acoustic model and a language model. For example, the acoustic model may include information associated with phonation, and the language model may include unit phoneme information and information about a combination of unit phoneme information. The speech recognition module may convert a user utterance into text data, using the information associated with phonation and unit phoneme information. For example, the information about the acoustic model and the language model may be stored in an automatic speech recognition database (ASR DB) 211.

According to an embodiment, the NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. As such, the NLU module 220 may obtain a domain, intent, or a parameter (or a slot) necessary to express the intent, from the user input.

According to an embodiment, the NLU module 220 may determine the intent of the user and parameter by using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to an embodiment, the NLU module 220 may grasp the meaning of words extracted from a user input by using linguistic features (e.g., syntactic elements) such as morphemes, phrases, and the like and may match the grasped meaning of the words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input by using the words, which are based for grasping the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information about the app to be executed, the action (e.g., at least one or more states) to be executed in the app, and a parameter necessary to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to another embodiment, the NLU module 220 may determine the app to be executed, the action to be executed in the app, and a parameter necessary to execute the action based on the intent of the user input and the parameter for the purpose of generating one path rule or a plurality of path rules. For example, the NLU module 220 may arrange the app to be executed and the action to be executed in the app by using information of the user terminal 100 depending on the intent of the user input in the form of ontology or a graph model for the purpose of generating the path rule. For example, the generated path rule may be stored in a path rule database (PR DB) 231 through the path planner module 230. The generated path rule may be added to a path rule set of the DB 231.

According to an embodiment, the NLU module 220 may select at least one path rule of the generated plurality of path rules. For example, the NLU module 220 may select an optimal path rule of the plurality of path rules. For another example, when only a part of action is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 at a request for the user input. For example, the NLU module 220 may transmit one path rule corresponding to the user input to the user terminal 100. For another example, the NLU module 220 may transmit the plurality of path rules corresponding to the user input to the user terminal 100. For example, when only a part of action is specified based on the user utterance, the plurality of path rules may be generated by the NLU module 220.

According to an embodiment, the path planner module 230 may select at least one path rule of the plurality of path rules.

According to an embodiment, the path planner module 230 may transmit a path rule set including the plurality of path rules to the NLU module 220. The plurality of path rules of the path rule set may be stored in the PR DB 231 connected to the path planner module 230 in the table form. For example, the path planner module 230 may transmit a path rule set corresponding to information (e.g., OS information or app information) of the user terminal 100, which is received from the intelligence agent 145, to the NLU module 220. For example, a table stored in the PR DB 231 may be stored for each domain or for each version of the domain.

According to an embodiment, the path planner module 230 may select one path rule or the plurality of path rules from the path rule set to transmit the selected one path rule or the selected plurality of path rules to the NLU module 220. For example, the path planner module 230 may match the user intent and the parameter to the path rule set corresponding to the user terminal 100 to select one path rule or a plurality of path rules and may transmit the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the action to be executed in the app based on the user intent and the parameter for the purpose of generating the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user intent grasped by the NLU module 220 is definite. For example, the DM module 240 may determine whether the user intent is clear, based on whether the information of a parameter is sufficient. The DM module 240 may determine whether the parameter grasped by the NLU module 220 is sufficient to perform a task. According to an embodiment, when the user intent is not clear, the DM module 240 may perform a feedback for making a request for necessary information to the user. For example, the DM module 240 may perform a feedback for making a request for information about the parameter for grasping the user intent.

According to an embodiment, the DM module 240 may include a content provider module. In the case where the content provider module executes an action based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the NLG module 250 may change specified information to a text form. Information changed to the text form may be a form of a natural language speech. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130

According to an embodiment, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

Figure 5B:
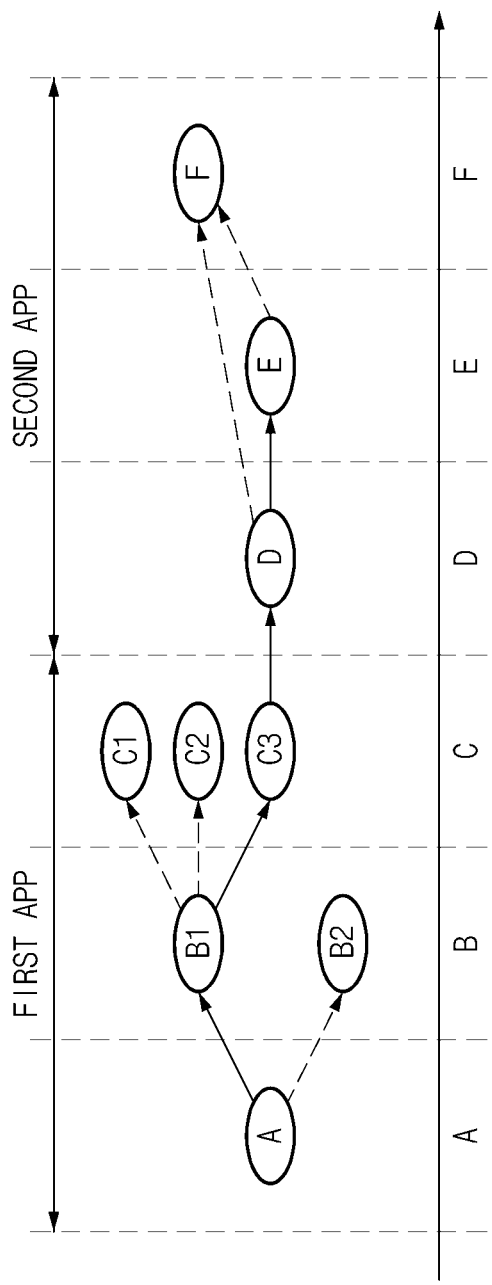
FIG. 5B is a diagram illustrating a path rule generating form of an intelligence server, according to an embodiment.

FIG. 5B is a diagram illustrating a path rule generating form of an intelligence server, according to an embodiment.

Referring to FIG. 5B, according to an embodiment, the NLU module 220 may divide the function of an app into any one action (e.g., state A to state F) and may store the divided unit actions in the PR DB 231. For example, the NLU module 220 may store a path rule set including a plurality of path rules A-B1-C1, A-B1-C2, A-B1-C3-D-F, and A-B1-C3-D-E-F, which are divided into actions (e.g., states), in the PR DB 231.

According to an embodiment, the PR DB 231 of the path planner module 230 may store the path rule set for performing the function of an app. The path rule set may include a plurality of path rules, each of which includes a plurality of actions (e.g., a sequence of states). The action executed depending on a parameter input to each of the plurality of actions may be sequentially arranged in each of the plurality of path rules. According to an embodiment, the plurality of path rules implemented in a form of ontology or a graph model may be stored in the PR DB 231.

According to an embodiment, the NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to an embodiment, when there is no path rule completely matched to the user input, the NLU module 220 may deliver a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may deliver the one or more path rules to the user terminal 100.

According to an embodiment, the NLU module 220 may select one of a plurality of path rules based on an input added by the user terminal 100 and may deliver the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 for the purpose of transmitting the selected one path rule to the user terminal 100.

According to another embodiment, the NLU module 220 may determine the intent of a user and the parameter corresponding to the user input (e.g., an input for selecting C3) additionally entered by the user terminal 100 for the purpose of transmitting the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected one path rule.

According to an embodiment, when a user input in which information is insufficient is received by the intelligence server 200, the NLU module 220 may generate a path rule partly corresponding to the received user input. For example, the NLU module 220 may transmit the partly corresponding path rule to the intelligence agent 145. The processor 150 may execute the intelligence agent 145 to receive the path rule and may transmit the partly corresponding path rule to the execution manager module 147. The processor 150 may execute the first app 141 depending on the path rule through the execution manager module 147. The processor 150 may transmit information about an insufficient parameter to the intelligence agent 145 through the execution manager module 147 while executing the first app 141. The processor 150 may make a request for an additional input to a user by using the information about the insufficient parameter, through the intelligence agent 145. When an additional input is received by a user through the intelligence agent 145, the processor 150 may transmit and process a user input to the intelligence server 200. The NLU module 220 may generate a path rule to be added, based on the intent of the user input additionally entered and parameter information and may transmit the path rule to be added, to the intelligence agent 145. The processor 150 may transmit the path rule to the execution manager module 147 through the intelligence agent 145 to execute the second app 143.

According to an embodiment, when a user input, in which a portion of information is missing, is received by the intelligence server 200, the NLU module 220 may transmit a user information request to the personalization information server 300. The personalization information server 300 may transmit information of a user entering the user input stored in a persona database to the NLU module 220. The NLU module 220 may select a path rule corresponding to the user input in which a part of an action is partly missing, by using the user information. As such, even though the user input in which a portion of information is missing is received by the intelligence server 200, the NLU module 220 may make a request for the missing information to receive an additional input or may determine a path rule corresponding to the user input by using user information.

According to an embodiment, Table 2 attached below may indicate an exemplary form of a path rule associated with a task that a user requests.

TABLE 2

| Path rule ID | State | Parameter |
|---|---|---|
| Gallery_101 | PictureView(25) | NULL |
| | SearchView(26) | NULL |
| | SearchViewResult(27) | Location, time |
| | SearchEmptySelectedView(28) | NULL |
| | SearchSelectedView(29) | ContentType, selectall |
| | CrossShare(30) | Anaphora |

Referring to Table 2, a path rule that is generated or selected by an intelligence server (the intelligence server 200 of FIG. 1) depending on a user utterance (e.g., "please share a photo") may include at least one state 25, 26, 27, 28, 29 or 30. For example, the at least one state (e.g., one operating state of a terminal) may correspond to at least one of the photo application execution PicturesView 25, the photo search function execution SearchView 26, the search result display screen output SearchViewResult 27, the search result display screen output, in which a photo is non-selected, SearchEmptySelectedView 28, the search result display screen output, in which at least one photo is selected, SearchSelectedView 29, or the share application selection screen output CrossShare 30.

In an embodiment, parameter information of the path rule may correspond to at least one state. For example, it is possible to be included in the state of SearchSelectedView 29, in which at least one photo is selected.

The task (e.g., "please share a photo!") that the user requests may be performed depending on the execution result of the path rule including the sequence of the states 25, 26, 27, 28, and 29.

According to the above description, the intelligence server 200 may process a user input (e.g., voice input) according to the user utterance received from the user terminal 100 through a series of processes to derive the intent of the user utterance and may generate or select a path rule corresponding to the derived user utterance intent.

In an embodiment, the intelligence server 200 may map at least a piece of user utterance data received from the user terminal 100 of FIG. 1B to the state related information (e.g., state ID) of the user terminal 100 at the user utterance occurrence time to manage the mapped result through a database. Alternatively, the intelligence server 200 may provide the personalization information server 300 of FIG. 1B with the user utterance data and the state related information, which are received from the user terminal 100, and then may support at least one information management associated with the user terminal 100 of the personalization information server 300 or a user.

In an embodiment, when the intelligence server 200 receives the identified state information (e.g., state ID) from user terminal 100, the intelligence server 200 may identify the user utterance (e.g., a user utterance occurring as the frequency of occurrences exceeds a specified threshold value or a user utterance occurring most frequently) that heavily occurred among the user utterances occurring in the state identified in the user terminal 100, with reference to the database accumulated by mapping the user utterance data to the state information (e.g., state ID) of the user terminal 100 and information resources on the personalization information server 300. The intelligence server 200 may include the user utterance included in the specified priority range among the heavily occurring user utterances in the above-described hint to transmit the above-described hint to the user terminal 100.

Alternatively, when there is no history information of a user utterance, which has occurred in the state identified by the user terminal 100 or when the cumulative number of user utterances (or the frequency of occurrences) that occurred in the identified state is not greater than the specified threshold value, the intelligence server 200 may determine whether a state linked with the identified state is present. When there is a state linked with the identified state (e.g., Detail View), for example, the intelligence server 200 may transmit, to the user terminal 100, a hint according to a user utterance (e.g., a user utterance that occurs as the frequency of occurrences exceeds a specified threshold value or a user utterance occurring most frequently) that has occurred heavily among hints corresponding to the previous state (e.g., SearchViewResult) of the identified state.

Alternatively, when attribute information (e.g. meta data of content included in the identified state) associated with the identified state, location information, time information, or the like are provided from the user terminal 100 together with the identified related information, the intelligence server 200 may provide the user terminal 100 with the hint generated or selected with reference to the attribute information, the location information, or the time information. At least one path rule generated or selected by the intelligence server 200 may be distinguished by unique identification information (e.g., path rule ID) and may include a respective representative utterance. For example, the path rule, to which Gallery 102 is assigned as the identification information (e.g., path rule ID), may include "move recent New York photos to a travel album" as the representative utterance; the words "travel", "New York", or "photo" on the representative utterance may function as a parameter required to process the user utterance. The path rule according to the representative utterance may be implemented as at least one state (e.g., PicturesView, SearchView, SearchViewResult, SearchEmptySelectedView, SearchSelectedView, MoveToAlbum, CreateAlbum, or Create) for performing a functional operation of an app corresponding to the derived user utterance intent.

TABLE 3

Create and move a new album with
(Kansas/albumName@CreateAlbum).
Create a new album with (Kansas/albumName@CreateAlbum)
and move (All/selectAll@SearchSelectedView).
Create a new album and move
(files/contentType@SearchSelectedView)
(3/selectCount@SearchSelectedView).
Create a new album and move
(last/selectOrderType@SearchSelectedView)
(third/ordinal@ SearchSelectedView).
Create a new album with (Kansas/albumName@CreateAlbum)
and move a photo of which the title is (Youngseob/title@
SearchViewResult), from among photos captured in
(stadium/location@SearchViewResult).

TABLE 3-continued

Create a new album with (Kansas/albumName@CreateAlbum)
and move a photo, which is captured at
(4 o'clock/time@SearchViewResult), from among
photos captured in (stadium/location@SearchViewResult).
. . .

Table 3 may show an exemplary form of a sub utterance capable of being generated based on the combination of at least one parameter (e.g. a travel, New York, a photo, or the like) included on the representative utterance. When the intelligence server 200 receives at least one information (e.g., state ID, the attribute information, the location information, the time information, or the like) associated with the identified state from user terminal 100, the intelligence server 200 may generate at least one sub utterance by applying the received at least one information as a parameter and then may transmit the generated sub utterance to the user terminal 100.

Figure 5C:
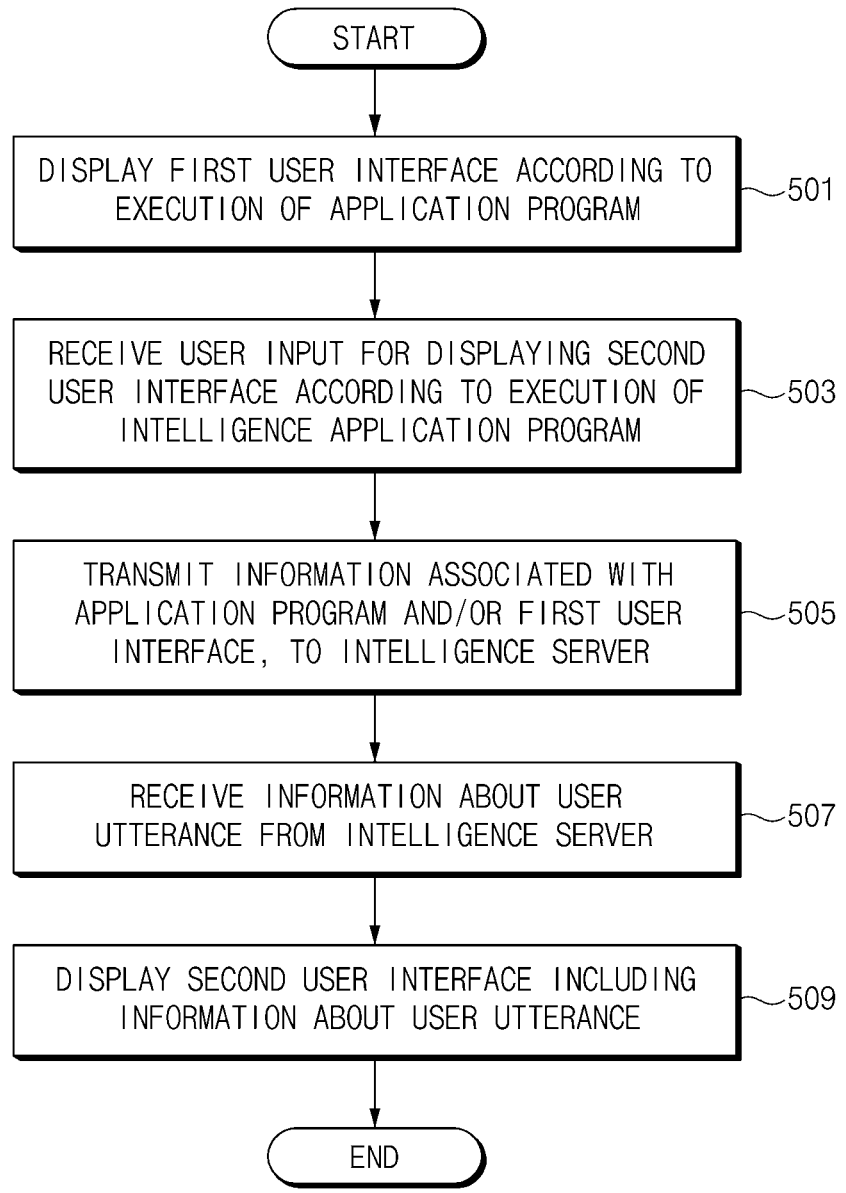
FIG. 5C is a diagram illustrating a method of providing a natural language expression of a user terminal, according to an embodiment.

FIG. 5C is a diagram illustrating a method of providing a natural language expression of a user terminal, according to an embodiment.

Referring to FIG. 5C, in operation 501, the processor 150 of FIG. 1B of the user terminal 100 of FIG. 1B may execute an application program mounted or installed in the user terminal 100, in response to user control. In an embodiment, it may be understood that the first user interface output depending on the execution of the application program is a specific state having a unique state identification (ID) (or identifier).

In operation 503, the processor 150 may receive a user input for outputting a second user interface according to contents curation service operation (or according to the operation of the above-described intelligence app). For example, the processor 150 may activate the contents curation service in response to a user input (e.g., double press) applied to the hardware button 112 of FIG. 1C included in the user terminal 100, a user input (e.g., press hold) applied to a home button, or a user input (e.g., voice input) according to a specified user utterance (e.g., Hello Bixby).

In operation 505, the processor 150 may transmit information (e.g., application program identification information, or the like) associated with the running application program and/or information (e.g., state ID or identifier) associated with the first user interface, to the intelligence server 200 of FIG. 1A in the integrated intelligence system 10 of FIG. 1A. For example, the processor 150 may identify the state of the user terminal 100 at the time of activation of the contents curation service and may transmit information (e.g., identification information of the running application program and/or the state ID of the first user interface being output depending on the execution of the application program) associated with the identified state to the intelligence server 200.

In operation 507, the processor 150 may receive information (e.g., hint) about at least one user utterance for requesting a task capable of being performed using the application program, from the intelligence server 200. In an embodiment, the information about the user utterance (e.g., hint) may be a text corresponding to at least part of the user utterances that occurred in the same state as the state of the user terminal 100 identified by the processor 150. For example, the information about the user utterance (e.g., hint) may include a text for the user utterance, of which the frequency exceeds a specified threshold value or which occurred most frequently, from among user utterances that occurred in the past.

In operation 509, for example, the processor 150 may output a second user interface according to the activation of the contents curation service, in the overlaid form to the first user interface according to the execution of the application program. In an embodiment, the processor 150 may include information (e.g., hint) about the user utterance received from the intelligence server 200, in the region of the second user interface. In an embodiment, when one (e.g., a text for a specific user utterance) among pieces of information (e.g., hint) about the user utterance is selected (e.g., touch or utterance) by the user, the processor 150 may transmit the selected information to the intelligence server 200. Afterward, the processor 150 may execute an intelligence app to perform the task corresponding to the selected information and may receive a path rule corresponding to the selected information from the intelligence server 200.

According to the above-described various embodiments, an electronic device may include a touch screen display, at least one communication circuit, a microphone, at least one speaker, at least one processor electrically connected to the touch screen display, the communication circuit, the microphone, and the speaker, and at least one memory electrically connected to the processor.

According to various embodiments, the memory may store a first application program including a first user interface and an intelligence application program including a second user interface.

According to various embodiments, the memory may stores instructions that, when executed, cause the processor to display the first user interface on the display, while displaying the first user interface, to receive a first user input for displaying the second user interface on the display, to transmit an identifier associated with the first application program and/or the first user interface to an external server through the communication circuit, to receive information about at least one utterance for making a request for a task performed by the electronic device, from the external server by using the first application program, and to display the second user interface including a text based at least partly on the received information about the utterance, on the display.

According to various embodiments, the memory may further store the instructions that cause the processor, after receiving the first user input, to determine whether the display is displaying a home screen or is displaying a user interface of one application program.

According to various embodiments, the electronic device may further include housing and a physical button disposed in one region of the housing or a touch detectable button.

According to various embodiments, the memory may further store the instructions that cause the processor to receive the first user input through the physical button or the touch detectable button.

According to various embodiments, the memory may further store the instructions that cause the processor to display the second user interface such that the second user interface is at least partially overlaid on the first user interface.

According to various embodiments, the memory may further store the instructions that cause the processor to include at least one state information corresponding to the first user interface in the identifier.

According to various embodiments, the information about the at least one utterance may be associated with a part of utterances, which occurred as a frequency of occurrences exceeds a specified threshold value, from among utterances that occurred with regard to an operation of the first application program and/or the first user interface.

According to various embodiments, the memory may further store the instructions that cause the processor, when there is no utterance, of which the frequency of occurrences exceeds a specified threshold value, from among utterances that occurred with regard to an operation of the first user interface, to receive information about at least one utterance associated with some utterances among utterances occurring with regard to an operation of a third user interface linked with the first user interface.

According to various embodiments, the memory may further store the instructions that cause the processor to receive the information about the at least one utterance corresponding to attribute information of content included in the first user interface.

According to various embodiments, the memory may further store the instructions that cause the processor to receive the information about the at least one utterance corresponding to location information or time information associated with an operation of the first application program and/or the first user interface.

According to various embodiments, the memory may further store the instructions that cause the processor to include an object capable of controlling the intelligence application program in the second user interface, so as not to display a text based at least partly on the received information about the utterance.

According to various embodiments, the memory may further store the instructions that cause the processor to receive a second user input for selecting at least part of the text.

According to various embodiments, the memory may further store the instructions that cause the processor to perform a task corresponding to the selected text in response to the received second user input.

According to various embodiments, the memory may further store the instructions that cause the processor to receive a sequence of at least one states of the electronic device from the external server to perform a task corresponding to the selected text.

According to the above-described various embodiments, a method of providing a natural language expression of an electronic device may include displaying a first user interface associated with a first application program, while displaying the first user interface, receiving a first user input for displaying a second user interface associated with an intelligence application program, transmitting an identifier associated with the first application program and/or the first user interface, to an external server, receiving information about at least one utterance for making a request for a task performed by the electronic device, from the external server by using the first application program, and displaying the second user interface including a text based at least partly on the received information about the utterance.

According to various embodiments, the receiving of the first user input may include determining whether a display of the electronic device is displaying a home screen or is displaying a user interface of one application program, after receiving the first user input.

According to various embodiments, the displaying of the second user interface may include displaying the second user interface so as to be at least partially overlaid on the first user interface.

According to various embodiments, the transmitting of the identifier to an external server may include including at least one state information corresponding to the first user interface in the identifier.

According to various embodiments, the receiving of the information about the at least one utterance from the external server may include receiving the information about the at least one utterance associated with a part of utterances, which occurred as a frequency of occurrences exceeds a specified threshold value, from among utterances that occurred with regard to an operation of the first application program and/or the first user interface.

According to various embodiments, the receiving of the information about the at least one utterance from the external server may include receiving information about at least one utterance associated with some utterances among utterances occurring with regard to an operation of a third user interface linked with the first user interface when there is no utterance, of which the frequency of occurrences exceeds a specified threshold value, from among utterances that occurred with regard to an operation of the first user interface.

According to various embodiments, the receiving of the information about the at least one utterance from the external server may include receiving the information about the at least one utterance corresponding to attribute information of content included in the first user interface.

According to various embodiments, the receiving of the information about the at least one utterance from the external server may include receiving the information about the at least one utterance corresponding to location information or time information associated with an operation of the first application program and/or the first user interface.

Figure 6:
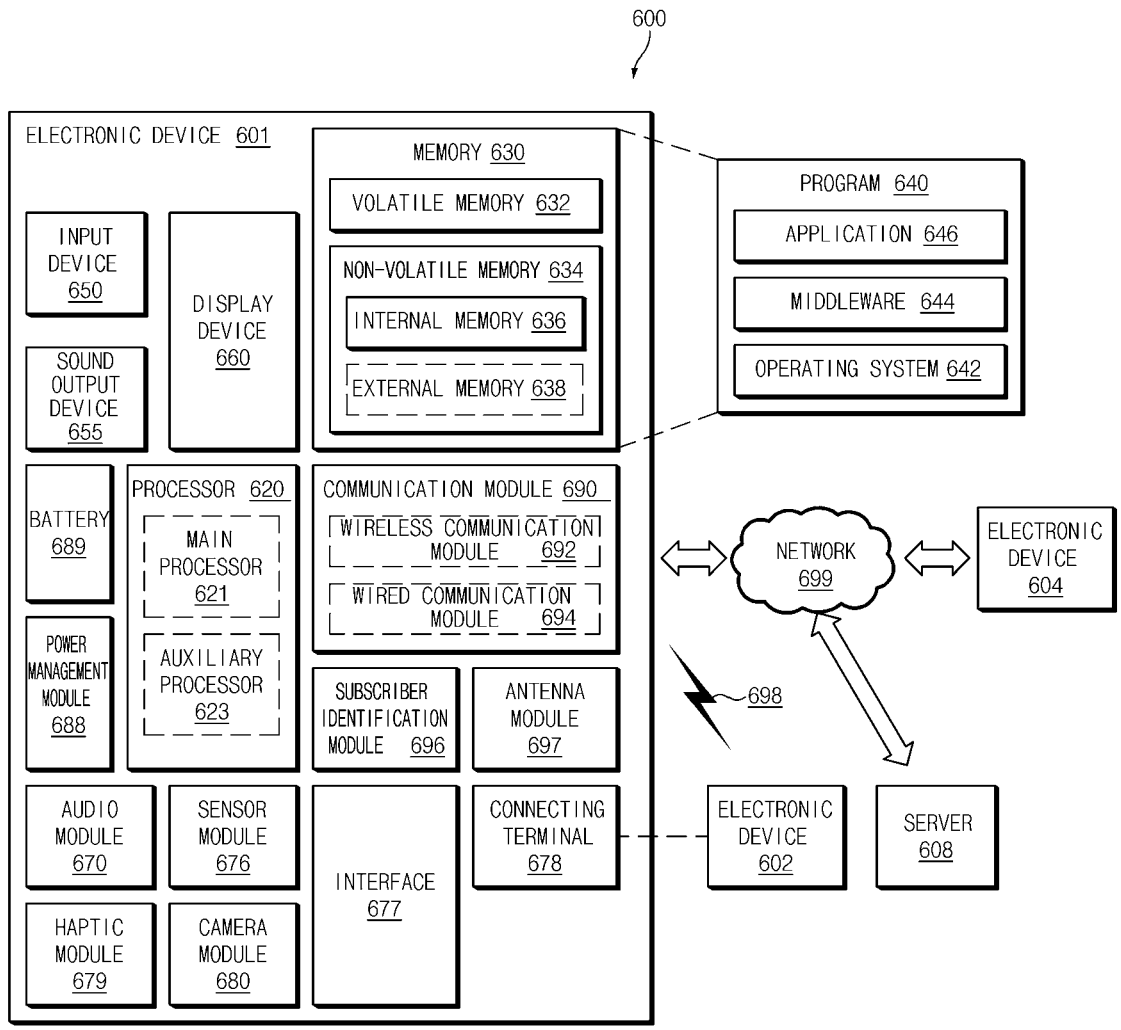
FIG. 6 is a diagram illustrating an electronic device in a network environment, according to an embodiment.

FIG. 6 is a block diagram of an electronic device in a network environment according to various embodiments.

Referring to FIG. 6, an electronic device 601 may communicate with an electronic device 602 through a first network 698 (e.g., a short-range wireless communication) or may communicate with an electronic device 604 or a server 608 through a second network 699 (e.g., a long-distance wireless communication) in a network environment 600. According to an embodiment, the electronic device 601 may communicate with the electronic device 604 through the server 608. According to an embodiment, the electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module 696, and an antenna module 697. According to some embodiments, at least one (e.g., the display device 660 or the camera module 680) among components of the electronic device 601 may be omitted or other components may be added to the electronic device 601. According to some embodiments, some components may be integrated and implemented as in the case of the sensor module 676 (e.g., a fingerprint sensor, an iris sensor, or an illuminance sensor) embedded in the display device 660 (e.g., a display).

The processor 620 may operate, for example, software (e.g., a program 640) to control at least one of other components (e.g., a hardware or software component) of the electronic device 601 connected to the processor 620 and may process and compute a variety of data. The processor 620 may load a command set or data, which is received from other components (e.g., the sensor module 676 or the communication module 690), into a volatile memory 632, may process the loaded command or data, and may store result data into a nonvolatile memory 634. According to an embodiment, the processor 620 may include a main processor 621 (e.g., a central processing unit or an application processor) and an auxiliary processor 623 (e.g., a graphic processing device, an image signal processor, a sensor hub processor, or a communication processor), which operates independently from the main processor 621, additionally or alternatively uses less power than the main processor 621, or is specified to a designated function. In this case, the auxiliary processor 623 may operate separately from the main processor 621 or embedded.

In this case, the auxiliary processor 623 may control, for example, at least some of functions or states associated with at least one component (e.g., the display device 660, the sensor module 676, or the communication module 690) among the components of the electronic device 601 instead of the main processor 621 while the main processor 621 is in an inactive (e.g., sleep) state or together with the main processor 621 while the main processor 621 is in an active (e.g., an application execution) state. According to an embodiment, the auxiliary processor 623 (e.g., the image signal processor or the communication processor) may be implemented as a part of another component (e.g., the camera module 680 or the communication module 690) that is functionally related to the auxiliary processor 623. The memory 630 may store a variety of data used by at least one component (e.g., the processor 620 or the sensor module 676) of the electronic device 601, for example, software (e.g., the program 640) and input data or output data with respect to commands associated with the software. The memory 630 may include the volatile memory 632 or the nonvolatile memory 634.

The program 640 may be stored in the memory 630 as software and may include, for example, an operating system 642, a middleware 644, or an application 646.

The input device 650 may be a device for receiving a command or data, which is used for a component (e.g., the processor 620) of the electronic device 601, from an outside (e.g., a user) of the electronic device 601 and may include, for example, a microphone, a mouse, or a keyboard.

The sound output device 655 may be a device for outputting a sound signal to the outside of the electronic device 601 and may include, for example, a speaker used for general purposes, such as multimedia play or recordings play, and a receiver used only for receiving calls. According to an embodiment, the receiver and the speaker may be either integrally or separately implemented.

The display device 660 may be a device for visually presenting information to the user of the electronic device 601 and may include, for example, a display, a hologram device, or a projector and a control circuit for controlling a corresponding device. According to an embodiment, the display device 660 may include a touch circuitry or a pressure sensor for measuring an intensity of pressure on the touch.

The audio module 670 may convert a sound and an electrical signal in dual directions. According to an embodiment, the audio module 670 may obtain the sound through the input device 650 or may output the sound through an external electronic device (e.g., the electronic device 602 (e.g., a speaker or a headphone)) wired or wirelessly connected to the sound output device 655 or the electronic device 601.

The sensor module 676 may generate an electrical signal or a data value corresponding to an operating state (e.g., power or temperature) inside or an environmental state outside the electronic device 601. The sensor module 676 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 677 may support a designated protocol wired or wirelessly connected to the external electronic device (e.g., the electronic device 602). According to an embodiment, the interface 677 may include, for example, an HDMI (high-definition multimedia interface), a USB (universal serial bus) interface, an SD card interface, or an audio interface.

A connecting terminal 678 may include a connector that physically connects the electronic device 601 to the external electronic device (e.g., the electronic device 602), for example, an HDMI connector, a USB connector, an SD card connector, or an audio connector (e.g., a headphone connector).

The haptic module 679 may convert an electrical signal to a mechanical stimulation (e.g., vibration or movement) or an electrical stimulation perceived by the user through tactile or kinesthetic sensations. The haptic module 679 may include, for example, a motor, a piezoelectric element, or an electric stimulator.

The camera module 680 may shoot a still image or a video image. According to an embodiment, the camera module 680 may include, for example, at least one lens, an image sensor, an image signal processor, or a flash.

The power management module 688 may be a module for managing power supplied to the electronic device 601 and may serve as at least a part of a power management integrated circuit (PMIC).

The battery 689 may be a device for supplying power to at least one component of the electronic device 601 and may include, for example, a non-rechargeable (primary) battery, a rechargeable (secondary) battery, or a fuel cell.

The communication module 690 may establish a wired or wireless communication channel between the electronic device 601 and the external electronic device (e.g., the electronic device 602, the electronic device 604, or the server 608) and support communication execution through the established communication channel. The communication module 690 may include at least one communication processor operating independently from the processor 620 (e.g., the application processor) and supporting the wired communication or the wireless communication. According to an embodiment, the communication module 690 may include a wireless communication module 692 (e.g., a cellular communication module, a short-range wireless communication module, or a GNSS (global navigation satellite system) communication module) or a wired communication module 694 (e.g., an LAN (local area network) communication module or a power line communication module) and may communicate with the external electronic device using a corresponding communication module among them through the first network 698 (e.g., the short-range communication network such as a Bluetooth, a WiFi direct, or an IrDA (infrared data association)) or the second network 699 (e.g., the long-distance wireless communication network such as a cellular network, an internet, or a computer network (e.g., LAN or WAN)). The above-mentioned various communication modules 690 may be implemented into one chip or into separate chips, respectively.

According to an embodiment, the wireless communication module 692 may identify and authenticate the electronic device 601 using user information stored in the subscriber identification module 696 in the communication network.

The antenna module 697 may include one or more antennas to transmit or receive the signal or power to or from an external source. According to an embodiment, the communication module 690 (e.g., the wireless communication module 692) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 601 and the external electronic device 604 through the server 608 connected to the second network 699. Each of the electronic devices 602 and 604 may be the same or different types as or from the electronic device 601. According to an embodiment, all or some of the operations performed by the electronic device 601 may be performed by another electronic device or a plurality of external electronic devices. When the electronic device 601 performs some functions or services automatically or by request, the electronic device 601 may request the external electronic device to perform at least some of the functions related to the functions or services, in addition to or instead of performing the functions or services by itself. The external electronic device receiving the request may carry out the requested function or the additional function and transmit the result to the electronic device 601. The electronic device 601 may provide the requested functions or services based on the received result as is or after additionally processing the received result. To this end, for example, a cloud computing, distributed computing, or client-server computing technology may be used.

The electronic device according to various embodiments disclosed in the disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 640) including an instruction stored in a machine-readable storage media (e.g., an internal memory 636 or an external memory 638) readable by a machine (e.g., a computer). The machine may be a device that calls the instruction from the machine-readable storage media and operates depending on the called instruction and may include the electronic device (e.g., the electronic device 601). When the instruction is executed by the processor (e.g., the processor 620), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   a touch screen display;
   at least one communication circuit;
   a microphone;
   at least one speaker;
   at least one processor electrically connected to the touch screen display, the communication circuit, the microphone, and the speaker; and
   at least one memory electrically connected to the processor,
   wherein the memory stores a first application program including a first user interface and an intelligence application program including a second user interface, and
   wherein the memory stores instructions that, when executed, cause the processor to:
      display the first user interface on the touch screen display;
      while displaying the first user interface, receive a first user input;
      in response to the first user input, activate the intelligence application program; and
      while activating the intelligence application program:
         transmit an identifier associated with at least one of the first application program or the first user interface to an external server through the communication circuit;
         receive information about at least one utterance corresponding to at least one task, from the external server, the at least one task being associated with the first application program; and
         display the second user interface including a text on the touch screen display, the text corresponding at least partly to the received information about the at least one utterance,
      wherein the at least one task is able to be performed by the electronic device when the at least one utterance is input by a user.

2. The electronic device of claim 1, wherein the memory further stores the instructions that cause the processor to:
   after receiving the first user input, determine whether the touch screen display is displaying a home screen or is displaying a user interface of one application program.

3. The electronic device of claim 1, further comprising:
   a housing; and
   a physical button disposed in one region of the housing or a touch detectable button,
   wherein the memory further stores the instructions that cause the processor to:
      receive the first user input through the physical button or the touch detectable button.

4. The electronic device of claim 1, wherein the memory further stores the instructions that cause the processor to:
   display the second user interface such that the second user interface is at least partially overlaid on the first user interface.

5. The electronic device of claim 1, wherein the memory further stores the instructions that cause the processor to:
   include at least one state information corresponding to the first user interface in the identifier.

6. The electronic device of claim 1, wherein the information about the at least one utterance is associated with a part of utterances, which occurred as a frequency of occurrences exceeds a specified threshold value, from among utterances that occurred with regard to at least one of an operation of the first application program or the first user interface.

7. The electronic device of claim 6, wherein the memory further stores the instructions that cause the processor to:
   when there is no utterance, of which the frequency of occurrences exceeds the specified threshold value, from among utterances that occurred with regard to an operation of the first user interface, receive information about at least one utterance associated with some utterances among utterances occurring with regard to an operation of a third user interface linked with the first user interface.

8. The electronic device of claim 1, wherein the memory further stores the instructions that cause the processor to:
   receive the information about the at least one utterance corresponding to attribute information of content included in the first user interface.

9. The electronic device of claim 1, wherein the memory further stores the instructions that cause the processor to:
   receive the information about the at least one utterance corresponding to location information or time information associated with at least one of an operation of the first application program or the first user interface.

10. The electronic device of claim 1, wherein the memory further stores the instructions that cause the processor to:
    include an object capable of controlling the intelligence application program not to display the text in the second user interface.

11. The electronic device of claim 1, wherein the memory further stores the instructions that cause the processor to:
    receive a second user input for selecting at least part of the text; and
    perform a task corresponding to the selected text in response to the received second user input.

12. The electronic device of claim 11, wherein the memory further stores the instructions that cause the processor to:
    receive a sequence of at least one of states of the electronic device from the external server to perform the task corresponding to the selected text.

13. A method of providing a natural language expression of an electronic device, the method comprising:
    displaying a first user interface associated with a first application program;
    while displaying the first user interface, receiving a first user input;
    in response to the first user input, activating an intelligence application program; and
    while activating the intelligence application program:
       transmitting an identifier associated with at least one of the first application program or the first user interface, to an external server;
       receiving information about at least one utterance corresponding to at least one task, from the external server, the at least one task being associated with the first application program; and
       displaying a second user interface including a text, the text corresponding at least partly to the received information about the at least one utterance,
    wherein the at least one task is able to be performed by the electronic device when the at least one utterance is input by a user.

14. The method of claim 13, wherein the receiving of the first user input includes:

after receiving the first user input, determining whether a display of the electronic device is displaying a home screen or is displaying a user interface of one application program.

15. The method of claim 13, wherein the displaying of the second user interface includes:
    displaying the second user interface so as to be at least partially overlaid on the first user interface.

\* \* \* \* \*